Dec. 14, 1954      O. BROWN      2,696,957

LANDING AND LAUNCHING SYSTEM FOR AIRCRAFT

Filed April 27, 1948      5 Sheets-Sheet 1

Owen Brown
INVENTOR.

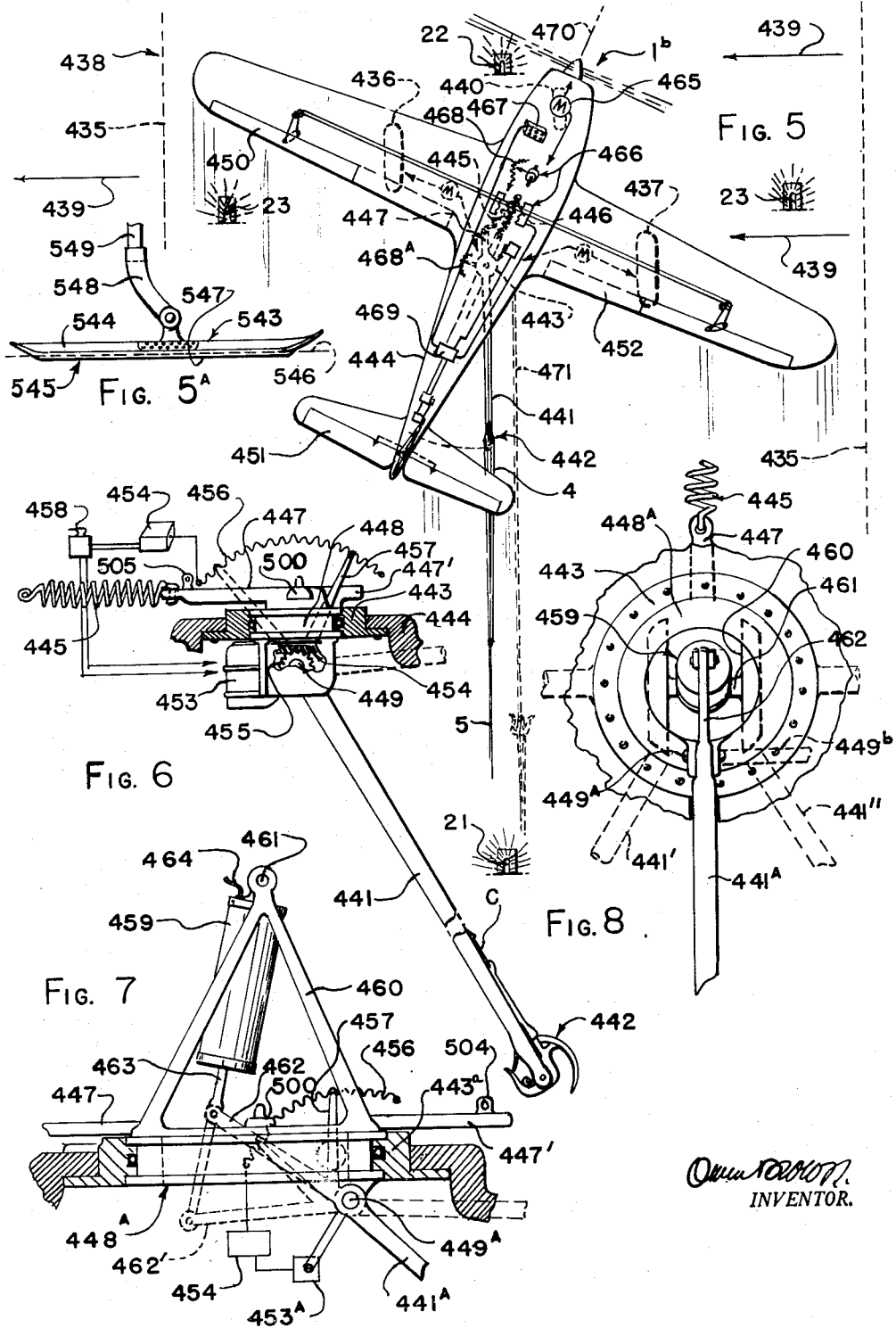

Dec. 14, 1954     O. BROWN     2,696,957
LANDING AND LAUNCHING SYSTEM FOR AIRCRAFT
Filed April 27, 1948     5 Sheets-Sheet 3
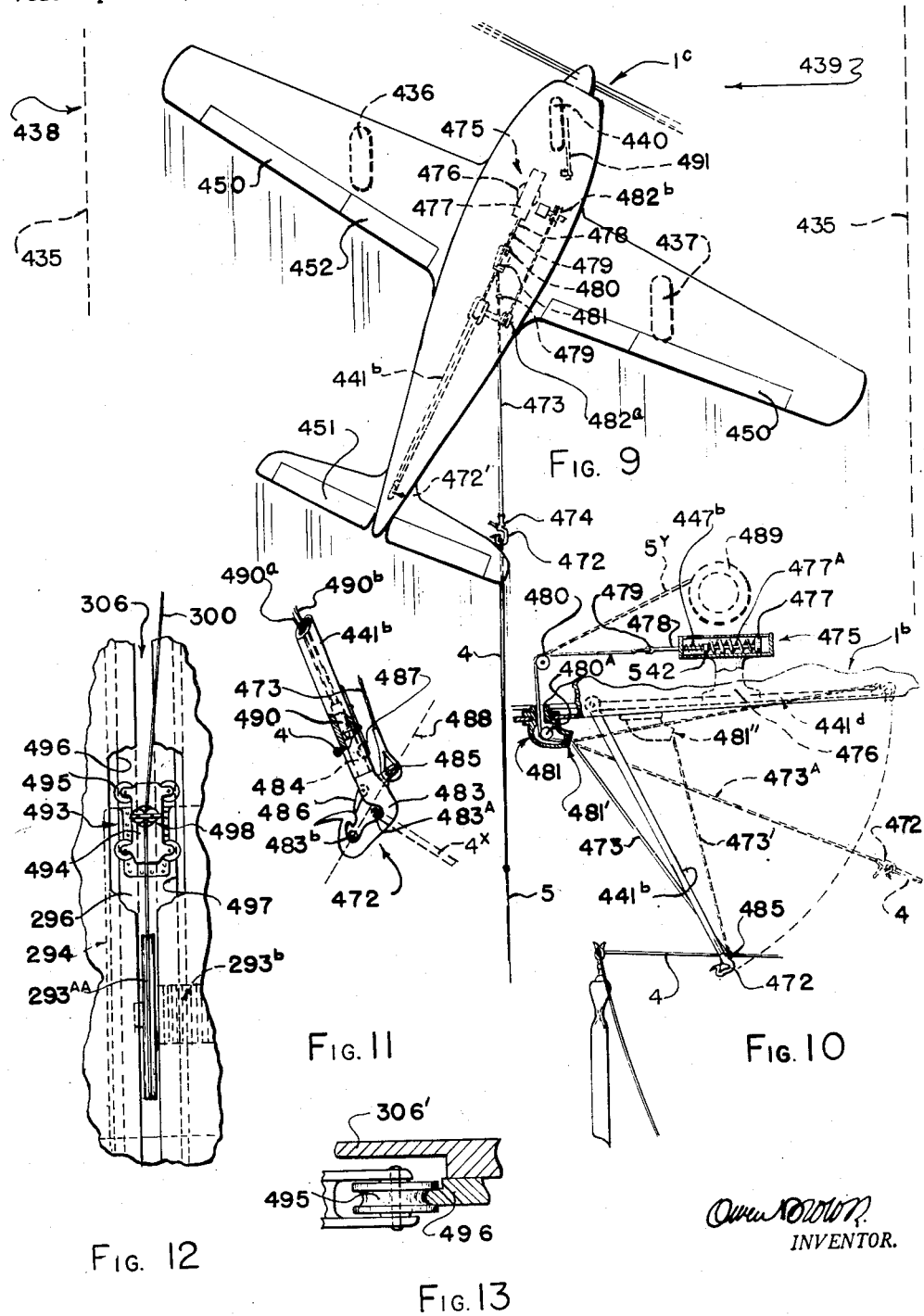
INVENTOR.

Dec. 14, 1954  O. BROWN  2,696,957
LANDING AND LAUNCHING SYSTEM FOR AIRCRAFT
Filed April 27, 1948  5 Sheets-Sheet 4
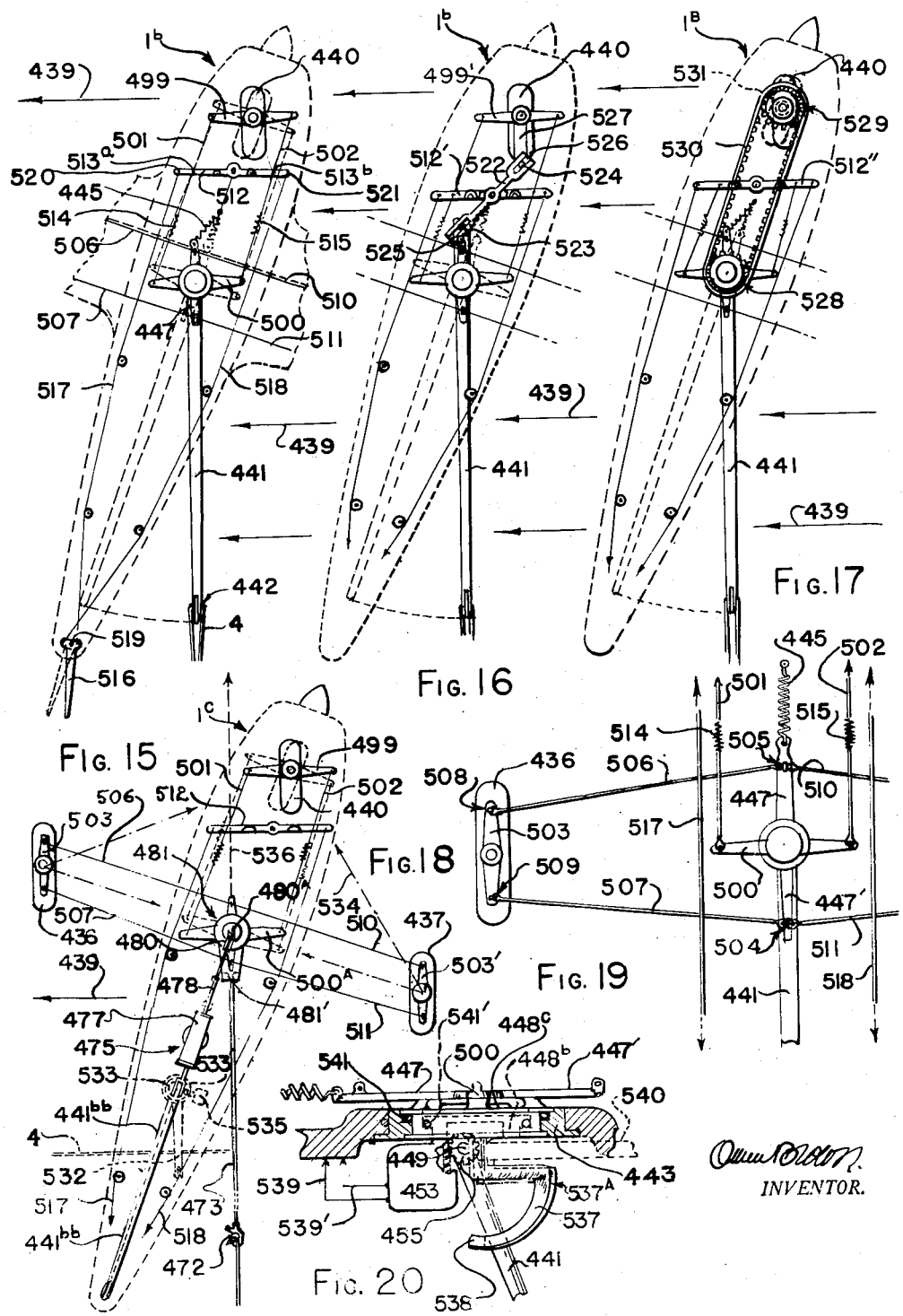
INVENTOR.

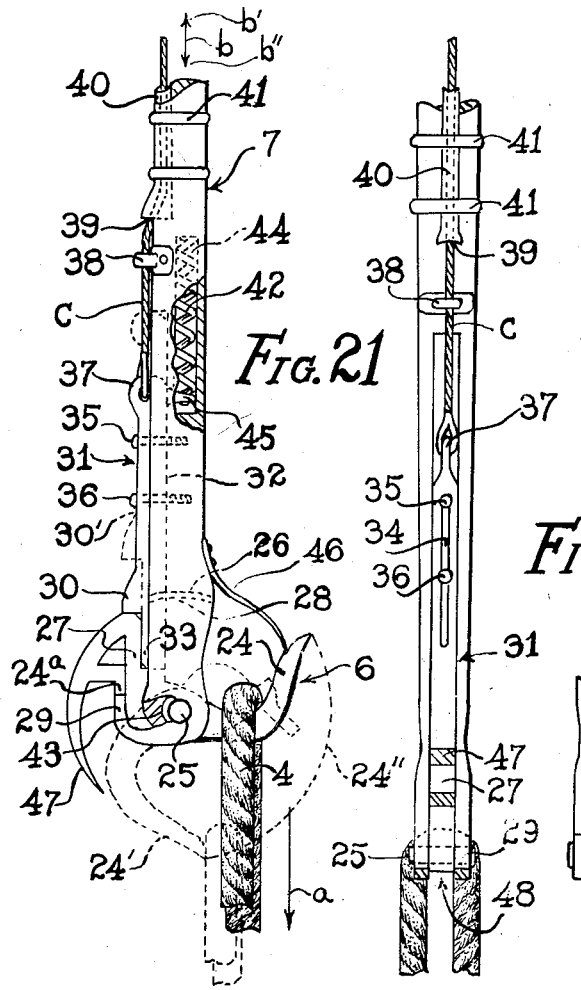

United States Patent Office

2,696,957
Patented Dec. 14, 1954

2,696,957

LANDING AND LAUNCHING SYSTEM FOR AIRCRAFT

Owen Brown, Los Angeles, Calif.

Application April 27, 1948, Serial No. 23,646

16 Claims. (Cl. 244—110)

My invention primarily relates to novel means and modes for quickly, safely, economically, landing aircraft.

Launching methods and apparatus are also dealt with incidentally.

The disclosed system contemplates landings within a very short length of runway space, the operation being largely automatic, relatively fool proof, and of exceedingly brief duration. It also contemplates the use of apparatus which is of especially low initial cost per installation, low in upkeep expense, positive and simple in its action, and above all affording a high degree of safety to pilot and/or crew as well as to the passengers whenever carried. The cost of equipment required on the individual aircraft is especially small.

The necessary landing station apparatus can readily be installed, now or hereafter, in down-town traffic zones, such as proposed roof-top airfields, as well as at sundry other locations; for example: on the outskirts of the smallest hamlets or suburban communities; on brief runway strips of private estates; on farms and ranches, small islands and mountain tops; on naval aircraft carriers and ocean liners, and sundry other places.

Because of the increasingly serious problem of congestion in metropolitan areas, wherein aircraft may offer the only material relief in time to come, the invention broadly envisions yet other components, whereby heavy airplane traffic may be brought into such populous centers; and whereby the landing stations may be incorporated with improved other facilities of a well coordinated urban traffic lay-out.

Such supplemental utilities, however, while originally disclosed, are not specifically discussed herein since not immediately required to carry out the invention which is expressly dealt with and claimed hereinafter.

Among the contemplated objectives is the provision of greatly improved landing facilities on aircraft carriers, in lieu of existing means for merely arresting and stopping carrier-based planes when no longer airborne.

Another object is to provide similar facilities for safely, easily landing airplanes upon proposed "flight decks" of ocean liners.

An incidental object, looking to the future, is to provide small spot-landing depots adjacent large metropolitan airports, whereby to expedite inbound and outbound traffic by light aircraft to and from the larger commercial carriers, in partial displacement of automotive vehicles.

Another incidental object is to provide means for installing any required number of emergency landing depots for military operations if and as required in newly acquired terrain, and in the briefest possible time.

Another object is to greatly lessen the necessary run-off space required in landing an airplane and to accomplish the same with a minimum of landing "sensation"; hence in a fully cushioned manner.

Another important object is to make nose-overs and ground loopings—they being among the most fruitful causes of airfield casualties—a virtual impossibility incident to a normal landing operation.

Among the important objects is the provision of positive, automatic means for overcoming the principal difficulties inherent in existing and proposed cross-wind landing systems, wherein certain types of so-called "drift-gear" have, thus far, proved unsafe and inadequate.

Another object is to provide a new kind of greatly improved cross-wind landing equipment on airplanes, co-operable with station tackle complementary thereto, whereby such planes, while being landed and decelerated, may be positively though yieldably guyed against nosing and looping as distinguished from cross-wind landings unassisted by such tackle.

Another object is to provide cross-wind landing equipment on airplanes, along with auxiliary station facilities, whereby airfields may be reduced to a small percentage of their present sizes, and whereby larger numbers thereof may be provided at a fraction of present costs and maintenance expenses.

Other objects will be apparent from a further perusal of the specification, inclusive of the claims and the drawings, in which latter the side elevation of Fig. 1 illustrates one of sundry possible applications of the invention. Featured are certain landing depot facilities in association with an airplane having complementary equipment thereon.

Fig. 2 is a plan view of landing surface apparatus such as shown in Fig. 1.

Fig. 3, taken from above, is a modification of the apparatus of Figs. 1 and 2 applicable especially to heavy-duty landings.

Fig. 4 illustrates a further feature which may, by option, be incorporated in the apparatus of either Figs. 1 and 2 or Fig. 3. The detail is a view from above.

Fig. 5, as seen from above, represents an airplane being automatically decelerated on a one-way landing strip, featuring cross-wind landing gear which includes a cross-wind type of landing boom and hook; said exhibit also including schematic indications of control means which may be employed in combination.

Fig. 5ª is an elevational side view of a casterable ski, having a runner therebelow adapting said ski for travel on either snow or ice, which may be used on the aircraft of Fig. 5.

Fig. 6, in side elevation, is the partially schematic showing of a cross-wind type of landing boom, with auxiliaries, which may be employed on the aircraft of Fig. 5.

Fig. 7 is also side elevational, and fragmental, showing a further modified type of cross-wind landing boom with auxiliaries.

Fig. 8 is a fragmental view from below of the boom arrangement of Fig. 7, as partially simplified and modified.

Figure 1:
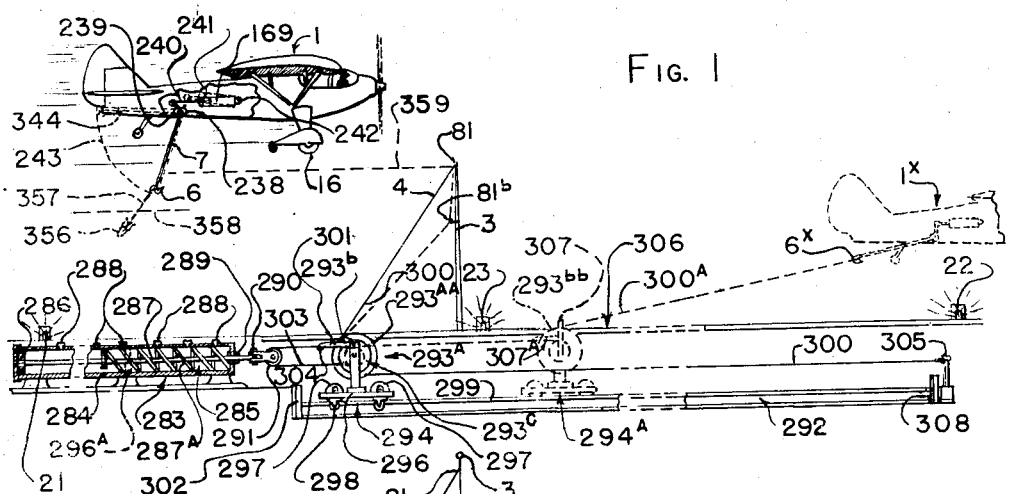

Fig. 9, looking down from above, shows a simplified modification of the cross-wind landing combination of Fig. 5, featuring more particularly, a boom adapted for coaction with a so-called halter line.

Fig. 10 is a fragmental detail of the airplane component of Fig. 9 as viewed in side elevation, illustrating one of the possible relationships between the boom and the halter there shown.

Fig. 11 is a side elevation detail of one type of boom-hook and halter assembly which may be employed.

Fig. 12, a plan view, shows the detail of an improvement which may be used in cross-wind and other landing procedures as a component of the decelerating mechanism.

Fig. 13 is a side-elevation of one of the sheave-dolly rollers of Fig. 12, including a section of the trackage detail therein.

Fig. 14 illustrates a so-called "escapement" device to be described in relation to the apparatus of Fig. 10.

Fig. 15, as viewed from above, is the layout of an inter-cooperative assembly of control components, including landing gear and rudder elements, for illustration, which may be coactuated automatically by the boom component of Figs. 5 to 8, inclusive.

Fig. 16 is similar to Fig. 15 featuring one of the various possible mechanical equivalents which may be used in lieu of certain elements shown in said Fig. 16 but omitting certain of the possible hook-ups previously detailed.

Fig. 17 is similar to both Fig. 15 and Fig. 16, wherein yet another of sundry equivalents may be employed.

Fig. 18 is, in certain respects, similar to the plan lay-outs of Figs. 15, 16 and 17 but is particularly related to the cross-wind mechanism and outboard tackle of Figs. 9 to 14 inclusive, of which it is an adaptation to accommodate the more complete control hook-ups first depicted in Fig. 15.

Fig. 19, as seen from above, is a fragmental detail of certain elements first shown in Fig. 5, and wherein actuation is automatically subject to the side-swings of the landing boom as relayed through the partially rotatable carriage elements of Figs. 6, 7 and 8, for example.

Fig. 20 is the broken open detail, in partial section, of cross-wind boom mechanism similar to comparable apparatus shown in connection with the airplane of Fig. 5, adapted for ordinary unassisted take-offs.

And Figs. 21 to 24 inclusive are fragmental views of so-called landing hooks to be described.

Like figures and characters indicate identical or substantially equivalent parts, having like functions, unless otherwise specifically noted.

It will be evident, after an examination of the drawings and a perusal of the description hereinafter, that the system disclosed is quite simple in its broad outlines, but entails the use of sub-apparatus of sundry preferred and alternative forms. And while various alternative arrangements may readily be devised hereafter, attention is now directed to one typical embodiment of the invention; namely, the instrumentalities shown in Figs. 1 to 4.

Since it is intended, obviously, to land the airborne craft 1 with the aid of surface tackle, the simple station facilities which I provide will be readily comprehended by numerous skilled persons, and especially such as have been identified with parcel pickup and delivery, as well as those members of the naval air wing who regularly operate airplanes to and from the flight decks of aircraft carriers.

The landing hook

Thus the boom 7, bearing hook 6, is comparable to somewhat similar tackle devices heretofore carried on pickup planes and may also be likened to conventional arresting gear on naval aircraft. The duality of station poles or standards 3, between which is suspended the loop 4 of a landing line 300, hereafter frequently referred to as "hawser," will also be recognized as not greatly unlike certain of the tackle devices heretofore employed in the services just referred to. Since the aforesaid boom and hook combination, as hereinafter modified, is a most important feature of my invention, it is deemed advisable to first refer thereto in some detail.

In Fig. 21, it will be seen that the lower section of boom 7 is slotted for limited rotative pivotal movement therethrough of the hook-jaw 24 from the pivot pin 25. See also the rearward view of Fig. 22. The slotted portion extends from the lower end of the boom to a point—indicated by the dotted arcuate line 26—which will permit clearance for the clockwise movement of rearward jaw member 27 when jaw 24, upon its release, is jerked downward and to the rear to phantom position 24' along arc 24". This action will occur when the pilot of the fully landed plane 1 wishes to disengage hook 6 from the loop 4; the tension on cable 300, as transmitted through loop 4 to the lower side of jaw 24, exerting considerable pull thereagainst until the latter is freed for limited arcuate movement, that is, until member 27 is permitted to describe the figure represented by the dotted arcuate line 28. Before its release, however, member 27 is in the safety position shown and cannot move in either direction, for the reason that anticlockwise movement, also, is prevented by the back-stop 29 at the point of its contact with shoulder 24a of the jaw member 27.

Bolt 31, in turn, is slidably movable within a longitudinal slot the bottom of which is indicated by line 32, its lower tip 33 nesting in between said member 27 and that portion of the slotted opening between jaw 24 and the upper limit of the slotted recess indicated at line 26. Bolt 31 is also provided with the key-slot 34 (see Fig. 22), through which slot extends the two stop-pins 35 and 36; pin 36 limiting its upward movement—see the stop-point of shoulder 30 at phantom point 30', Fig. 21—and pin 35 serving as an auxiliary stop against further downward movement of bolt 31 on its recovery, in addition to the intercepting action of member 27 against back-stop 29 as earlier mentioned.

Obviously, bolt 31 will not move out of the safety position, thereby freeing jaw 24, until, by election, the pilot actuates a suitable control, such as lever means or the like (not shown) or an element actuating some such means (not shown) whereby a tug is exerted on the pull-cord C having the lower terminal loop or thimble connected with eye 37 substantially as illustrated. Pull-cord C passes also through the eye 38 and thence, in this version, into the opening 39 of the sleeve 40, the latter being desirably recessed into the shank of boom 7 and secured therein by the retaining and re-inforcing ferrules 41.

Of course such movements as just described must be automatic, following actuation of pull-cord C, and for this purpose spring elements 42 and 43 are provided. Compression spring 42 controls the automatic recovery of bolt 31 to its locking position relative to jaw 24 and member 27, being disposed within the inner slot 44 and its lower end affixed to the projecting thumb 45 protruding into said slot from bolt 31. And torsion spring 43, shown quite briefly through the broken away area adjacent pivot pin 25, obviously controls the recovery of jaw 24 to the safety interlocked position immediately following its movement to position 24'; at which instant loop 4 will quickly escape over the end of said jaw in the direction of arrow a (see indication thereof adjacent phantom 24').

Jaw 24 may also have the safely spring latch 46, affixed to boom 7 approximately as shown, its readily depressible opposite end being preferably adapted to engage the small notch provided therefor on the inner side of the jaw against any possible premature escapement of loop 4. Such notch may be quite small so as not to interfere with the instantaneous release of the loop as explained; nor will it prevent the ready depression of spring latch 46 in order to receive said loop initially, owing to the curvature of the inner shank of hook 24 directly below the notch. Element 46 is not, of course, entirely essential.

Upper arrow b is self-explanatory, the head b' indicating the movement of the pull-cord upon actuation from the cock-pit and the lower head b" indicating the recovery of same to its fully extended position when shoulder 30 re-engages against member 27. For ample corner clearances, incidentally, said member 27 is beveled away as shown on its upper inner side, and a like beveling is provided on the outer corner of tip 33. Moreover, while the recovery of member 27 against back-stop 29 is instantaneous upon release of loop 4, necessitating but an extremely brief actuation of pull-cord C, it may be desirable, in order to make the double action function as fool-proof as possible, to prevent any possibility of the tip 33 returning to the lower position thereof, as seen in Fig. 21, before member 27 has snapped back against back-stop 29. For this purpose the arcuately formed spur 47 may be provided, which spur, by preference, extends backward as shown from the upper end of member 27.

Thus upon the movement of member 27 along the line 28, spur 47 may describe a like figure, so that at no time could tip 33 return to said lower position until member 27 had again contacted back-stop 29.

Said back-stop, incidentally, is slotted through on its lower side, as graphically seen at 48, Fig. 22. In order to afford a clear view of the slotted lower section of the shank of boom 7 (Fig. 22, at left), stop 29 is cut away except at lower right and left portions thereof which are indicated sectionally. For a like reason, spur 47, at both right and left in Fig. 22, is also removed except at its intersection with member 27. If desired, said spur may be additionally braced and strengthened by the web element seen quite clearly in Fig. 21 just above shoulder 24a.

The detailed hook-up between boom 7 and the control point, such as the pilot's cock-pit, is not shown since the preferred arrangement will normally occur to any skilled designer of the art in accord with this disclosure. I, therefore, merely show, in schematic manner, the general assembly hereinafter described with regard to Fig. 1 and elements 239 to 242. The upper end of said boom is preferably, but not necessarily, supported through a suitable slot 344 within the fuselage of plane 1. Obviously, too, this slot will, by preference, extend longitudinally along the belly of the plane to the tail end of same to clear the slipstream when boom 7 is fully retracted, and for the further purpose of providing sidewall bracing for said boom against any torsional movements thereof which may occur.

Moreover, as seen in the detail of Fig. 24, boom 7—in this particular arrangement—is preferably provided with some form of spring latch means or the like, as generally indicated at numeral 50'; so that when in the retracted position the same will be clasped against premature release. Any suitable means may be employed for extending and retracting boom 7 (as see later comment); and it is observed that the retracting action will, ordinarily, be superinduced in landing operations by the initial rearward tug of cable 300 as is clearly indicated by position 1$^x$ of aircraft 1 illustrated in Fig. 1, to be duly explained.

In this connection, it should be mentioned that an inboard extension from boom 7 may cooperate with a shock-absorber, which will be described later in connection with Fig. 1; also, that a special type of boom may be provided, having a pneumatic shock strut or its equivalent incorporated in the boom structure proper, as will be explained later relative to Figs. 5, 9 and 23.

Returning to Fig. 24, it is observed that, for this type of landing gear, the upper section of boom 7 can be formed as a yoke within which to receive the tail wheel 51; said yoke having the right and left arms 52—53. And these arms may each have the pivoted hubs 55 in engagement with the common axle shaft 56. Transmission of power to the boom may be effected in any desired manner exemplified by intermeshing gears 57. A sturdy boom of this character will be strongly additionally braced. Where the boom support can be mounted well up forward—as further discussed hereafter—there need be no problem of tail wheel clearance on airplanes having this kind of landing gear.

It is obvious that the version in Fig. 1 is not limited to any particular arrangement as regards the relative positioning of boom 7, wherein each designer will doubtless have a personal preference; also, that on planes having retractable tricycle gears, and no tail wheel, only the disposition of the boom need concern the designing draftsman.

Comparable boom and hook assemblies are detailed in my applications bearing Serial Numbers 707,151 and 707,152, the latter having matured into Patent 2,634,924.

Reference will now be made to one preferred type of station equipment which may be employed to land the airplane 1 previously referred to.

*Pneumatic differential units*

Referring first to Fig. 1, it is apparent that delayed-action braking, incidental to the landing of aircraft 1, is primarily supplied from the cylinders 283. Therein are employed elements comparable to the ordinary pneumatic door-check, including the tubular casing 284 defining chamber 285 within which is slidably mounted the plunger 286 at one end of piston rod 287. A relatively yieldable tension spring 287$^a$ may be positioned as indicated to retrieve plunger 282 after each landing operation, to be later detailed.

Casing 284 has one of the graduated series of bleeder vents 288, as required, and rod 287 may be slidable through a stuffing box 289. Alternatively, one or more bleeder vents (not shown) formed in the end-closure of the cylinder, adjacent said stuffing box, may be employed in lieu of openings 288. The outer end of rod 287 terminates, by option, in a flat link engagement within socket 290, the latter forming part of a fixture which carries the pulley wheel 291. This connection, which may be swiveled if desired, permits swingable movement but, in practice, the pull against piston 287 should be so exerted as to cause no binding.

Aside from the conventional pair of standards 3 and the trackage 292, the principal other component is comprised of the drum-and-pulley unit 293$^a$ mounted on dolly 294. Thus the over-size pulley 293$^{aa}$—see also Fig. 2—carried on one end of the drum 293$^b$, having the head member 293$^c$ on the opposite end of same. The dolly may be of any satisfactory construction, such as the simple arrangement of deck 296 supporting an upper pair of rollers 297—297 and two sets of retaining wheels 298 on respective under sides of rail top 299.

For greater stability, however, in view of the size of deck 296, a duality of auxiliary rails 299$^a$ and 299$^b$ may be provided for the retaining wheels (see Fig. 2) and this may prove to be the more preferred arrangement. If all four wheels 298 are well flanged and adapted to contact the tops of rails 299$^a$—299$^b$, it is probable that wheels 297 as well as monorail 299 can be dispensed with.

Wheels 298 are preferably flanged for centering the dolly relative to rail 299, being also adapted to engage the underside of said rail approximately as shown to prevent lifting up of the dolly from the action of hawser 300 at position 300$^a$. Any satisfactory level-wind (not shown), as required, may be provided. Numeral 302 indicates a yieldable backstop and buffer for the dolly.

The drum-line 303 is carried directly from the lower side of drum 293$^b$ to pulley 291 and thence to the anchor point 304 on the dolly. It is apparent that this anchor point need not, necessarily, be placed on the dolly but may be stationary. For instance, by advancing the starting point of dolly 294 to a location on track 292 somewhat farther ahead in the line of travel than the position of pulley 291 when fully extended, any suitable anchor post or the like, at such location, would afford an operable alternative to anchor point 304. Anchor 304 is integral with the yoke-like member 301 supporting the same, and which, for purposes of clarity, will be more particularly described hereafter with reference to the plan view of Fig. 3, where it is seen on the like apparatus there shown.

Figure 2:
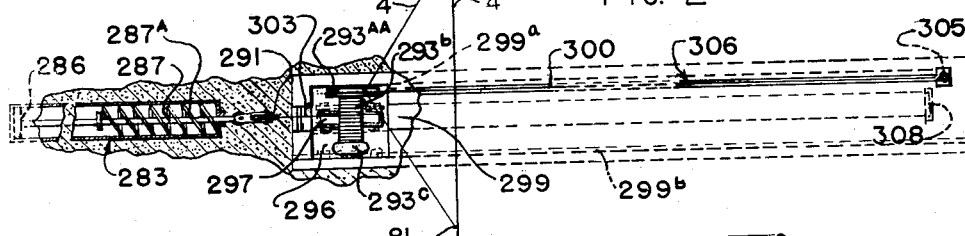

In addition to the drum-line 303, it is also necessary to provide a fixed anchor 305 for the hawser 300, and this, by preference, is a location on a true line directly forward of the oversize drum-pulley 293$^{aa}$, substantially as shown in Fig. 2, thereby permitting said hawser 300, in position 300$^a$, Fig. 1, to be carried through the slotted opening 306 (see also Fig. 2) along the roof of the disclosed subway to hook 6 of plane 1, when said hook is in the position of 6$^x$. Slot 306 may have metal side walls; and, since in continuous service considerable wear and tear on hawser 300 might occur from rubbing contacts with these side walls, particularly during cross-wind landings when light plane 1 could normally land and crab slightly to either right or left of trackage 292—or possibly more so if equipped with a cross-wind undercarriage as hereafter detailed—it is provided that the oversize pulley wheel 293$^{aa}$ may be so located in respect to the slotted grooving of opening 306 as to protrude, by preference, at least therethrough as indicated at position 293$^{bb}$. It may, as desired, protrude somewhat above the landing surface and may have the guard element 307 if required.

It is felt that the pulley wheel can be sufficiently narrow to additionally accommodate guide 307 through grooving 306. Such a guide could, of course, be positioned as seen by phantom 307$^a$, to ride just below the landing surface where, in conjunction with a deeply grooved pulley wheel, it would doubtless suffice. Obviously, such a construction would call for a suitable guide support, which could be conveniently carried from the hub cap, for example, and suitably arched at its outer end to adequately retain the hawser within said pulley grooving from the single support. A step pulley (not shown), for variable duties, may be used on surface installations, and pulley wheels of the subway type could have readily demountable annular adapters (not shown) for increasing or decreasing ratios between the rim speeds of said oversize pulley wheels and the corresponding speeds of the drum of required lesser diameter.

Numeral 308 indicates another buffer, of any efficient description, at the extreme frontal end of trackage 292 in case that in an emergency the dolly 294 should ever have to travel that far. As yoke 301 will be more clearly seen in Fig. 3, the same is omitted from the smaller plan view of Fig. 2. Electronic beacons 21—22 and 23—23, Figs. 1 and 3, which are employed to automatically bring about an accurate engagement between hook 6 and the loop 4 of hawser 300, will now be described.

While I do not wish to limit the scope of my concept to the electronic (or other) controls specifically shown, the schematic beacons or homes, identified merely by conventionalized electronic tubes associated with the landing surface, represent one efficient means for controlling the flight path of the airplane in coaction with supersensitive coordinants carried thereon.

Thus the forwardly disposed beacon 21, located on the approach to standards 3, may be a beam-emitting home positioned to align with companionate beacon 22 in a rearward location relative to the standards; and both beacons 21 and 22, which are conveniently identified as "longitudinal" homes, are preferably placed in a manner to correct yaw; so that said flight path relative to standards 3 will be automatically straight and true; and in order to facilitate the desired automatic result a duality of so-called "latitudinal" homes 23 are also provided. These are disposed in any preferred location at right and left sides of the flight path and, by preference, in the proximity of said standards.

Homes 21—22 and 23—23 have a function comparable to longitudinal homes C–1 and C–2 and latitudinal homes C–3 and C–4, Figs. 1ª and 13 of my co-entered and co-pending application bearing the amended title, High Speed Apparatus for Aircraft Systems, Including Methods Therewith, filed April 27, 1948, as Serial No. 23,647. Further particulars thereon may be had by reference to said copending application.

Reference is additionally made to the co-entered application bearing Serial No. 23,645, and to electronic beacons 232, 232 and 232' of Fig. 16 therein; which view further illustrates the method of controlling the glide path of an aircraft which is to be guidably homed in such manner as to produce an automatic engagement between loop tackle at a surface station and pickup means extensible from the airplane.

As for means to control the correct altitude of plane 1, particularly at the instant of engagement between hook 6 and loop 4, this function may, if desired, be taken over by any serviceable altimeter mechanism having the required sensitivity. Or the altitude of plane 1 could be regulated with the aid of one or another of the devices disclosed in said last named application, reference being had specifically to Figs. 156, 157 and 158 thereof.

It will be elementary to those skilled in such matters that, by utilizing a system of cooperative stationary beacons adapted to generate radiant energy to be picked up and computed by instrumentalities complementary thereto on the airplane—including coaction with the gyropilot and flight control means as further hereinafter explained—the exact flight path of plane 1 may be automatically controlled by electronic triangulation.

From the foregoing explanation concerning Figs. 1 and 2, it is evident that when hook 6, Fig. 1, engages the crosscord of loop 4 appendent from break-out clips 81 (these being in general of the type heretofore used in parcel and glider pickup systems; as see Patent No. 2,369,518 to H. W. Ballard), said loop will be snatched loose from standards 3 and very little more than the inertia of the freely rotatable drum $293^b$ will act, initially, as a drag on hawser 300, inclusive of the slight tension exerted by drum-line 303.

However, as dolly 294 is also bearing mounted to roll quite freely along track 292, having top rail 299, and inasmuch as all cordage, on light installations especially, may, by option, be of Nylon or its equivalent having often up to 25 to 30 per cent stretch, it is felt that ample delayed-action retardation will be supplied by the above defined apparatus, in conjunction with whatever provisions are deemed necessary to take out the shock of initial inertias versus the reverse or opposed drag of airborne plane 1 incidental to landing contacts. This component is taken care of, however, by element 169, Fig. 1, as well as by the shock-strut of Fig. 4 which will be considered hereinafter.

Clearly, if the initial compressibility factor relative to the pneumatic cylinder 283 is in question, this feature may be readily disposed of by providing any required number of bleeder vents in the wall 284 in the positions first shown. Thus, with a relatively free escapement of air initially, the braking action could be graduated as desired by properly spacing other vents 288, of the requisite sizes, one from another. And if located in the forward end closure, as was earlier explained, they could be dimensioned according to the predetermined travel of plunger 286 and dolly 294. These, to be sure, are matters of elementary detail within the province of skilled designers.

As dolly 294 moves forward along trackage 292, to position $294^a$, for example, with drum pulley $293^{aa}$ at position $293^{bb}$, it is clear that considerable delayed-action will have taken place automatically, accompanied by a forward movement of plunger 286, Fig. 1, to position $296^a$ and by the automatic lowering of plane 1 to position $1^x$. That is, aside from the initial inertia of the free-wheelable drum and dolly, and of piston rod 287, virtually all delayed-action braking, as distinguished from mere shock absorption, may be supplied by cylinder 283 operating in a fashion comparable to well known differential hoist mechanisms.

To be more precise, it is thought that the differential between pulley $293^{aa}$ and drum $293^b$, inclusive of pulley wheel 291, may be so predetermined and engineered as to provide ample tolerances in the pay-out of line 303—and the pay-off of line 300—from a relatively small cylinder of, possibly, not exceeding eight or ten feet in length for light plane landings. And this should provide for every normal and abnormal requirement as to the length of the respective lines and the length of trackage 292. Without attempting to suggest exact maximums or minimums, it is felt that other factors, when figured to a cylinder length of approximately ten feet, should be conservative on installations wherein light planes only need be considered.

While I do not regard the same as at all necessary, a still further component of delayed action could be introduced by making cylinder 283 itself slidable relative to its base means against the graduated tension of any suitably positioned spring element, shock strut or the like, not shown, which could be most conveniently located to the rear thereof.

For retraction of the dolly, a small servo motor, not shown in the drawing, could be carried directly thereon, along with suitable means for its remote control actuation, including an adaptable one-way clutch mechanism.

*Heavy-duty installations*

The simplified apparatus of Figs. 1 and 2 need not be limited to light planes, however, and no reason is foreseen why modified versions may not be used for landing either feeder planes or large commercial aircraft of the Constellation class, for illustration, on relatively short runways.

Obviously, flying boats and seaplanes could be landed with comparable equipment wherein the latter could be carried on piling at, above, or partially submerged within water-tight compartments therefor below the surface level; or the same could be installed on movable barges, which could be towed at will from place to place and anchored in any preferred manner. Thus, too, "landing tenders" could be outfitted with apparatus comparable to that shown in Fig. 1 for the rapid "landing" of small seaplanes previously catapulted from a parent vessel; and after each landing they could be quickly recovered and taken aboard by conventional cranes. Or the landing paraphernalia could be carried on retractable pontoons adapted to be extended and retracted inboard or outboard as desired. By employing a modified technique, a small high-speed bomber—large enough no doubt to carry atomic bomb loads—could be landed aboard a large size submarine traveling at surface level at partial, only, co-velocity with the said bomber. Other options are obvious.

Figure 3:
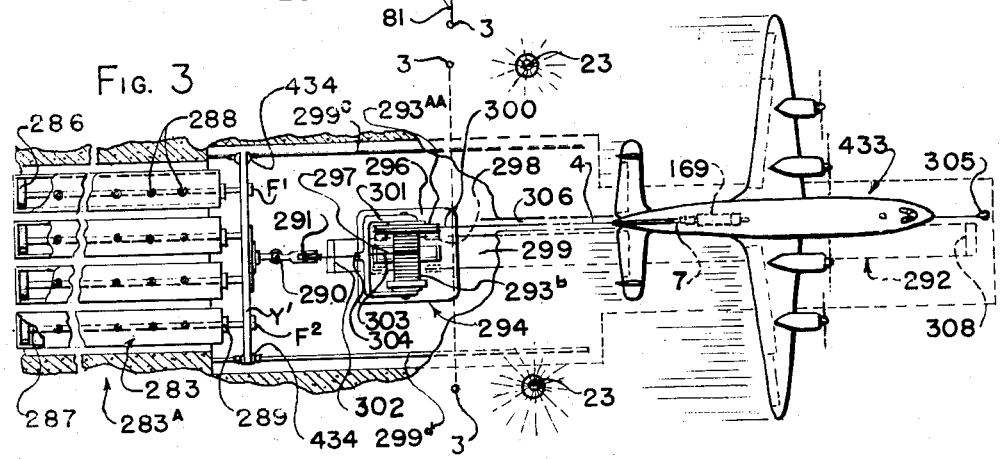

One type of heavy duty lay-out is shown in Fig. 3, wherein it is assumed that a very large cargo or passenger plane, such as an 85,000 pound, cargo-laden Constellation, is to be quickly, safety, smoothly landed on the shortest practicable length of runway. In the drawing, it is indicated that, as required, instead of a single extra large pneumatic cylinder 283, or, alternatively, a train of cylinders in tandem relations with unified piston means therebetween (not shown), it is a simple matter to provide a coordinated group of cylinders such as battery $283^a$, one abreast of the other; each of which cylinders may be connected up by means of the yoke or cross bar $Y^1$.

Moreover, on installations of this type, it would be possible to "cut in" or "cut out" any desired number of the cylinders to accommodate craft of relatively larger or smaller sizes. For illustration: the two outermost cylinders of battery $283^a$ could be readily idled by the expedient of disconnecting fixtures $F^1$—$F^2$ from yoke $Y^1$, leaving only the two innermost cylinders for delayed-action braking. These fixtures $F^1$ and $F^2$ could be of simple construction and readily provided, as to the details thereof, by skilled designers. For example, they could enter through horizontal slots and be locked by slide bolts or the like (not shown) or could be merely turned vertically, following horizontal engagement, and locked in that position by turnscrews. Vents 288 could also be valve-controlled, and, hence, adjustable to precise degrees of metered airflow therethrough with relation to the dolly and cable components and the sizes of the airplanes to be landed.

It is apparent that each of the cylinders 283 of Fig. 3 is comparable to the like elements of Figs. 1 and 2, inclusive of pistons 287 and stuffing boxes 289. And yoke 301 of the dolly 294 is associated, through the drum line, with pulley 291 carried in the block arrangement having the socket and coupling 290 as in Fig. 1. Drum-line 303 is not unlike the similar element in said Fig. 1, except as to its adaptation for heavy duty work, and the same is also seen as having been carried over pulley 291 from therebelow and anchored to yoke 301 at connection 304. Obviously, line 303 could pay out from the upper side of drum 293$^b$ and could be anchored at point 304 somewhat lower down, by merely lowering the anchorage of the yoke itself as desired (see Fig. 1). In that case, however, the hawser would, less desirably, be payed out from the under side of pulley 293$^{aa}$, which would only be fully practicable on surface installations.

Other elements similar to those already described with respect to Fig. 1 include the said oversize pulley 293$^{aa}$, deck 296, upper wheels 297, retaining wheels 298, toprail 299 of trackage 292, hawser 300, buffers 291—308, anchor 305, and a full complement of the required electronic homing and altitude-regulating devices as desired; inclusive, by option, of the "latitudinal" homes 23—23 previously explained. See also earlier reference to the location of retaining wheels 298, to ride rails 299$^a$—299$^b$, with optional omission of monorail 299, as indicated in Fig. 2.

It is especially to be noted that the slotted opening 306 has side walls sufficiently spaced to permit freedom of travel of pulley 293$^{aa}$ therethrough but the same, normally, may be substantially narrower than the tread of the nosewheel or wheels of airplane 433. On heavy duty installations of this type, it is desirable to provide rollable lateral supports—such as flanged rollers 434—434—for the yoke Y$^1$ against the possibility of its weight causing a bind where the plurality of pistons 287 are carried through stuffing boxes 289. And for this purpose the small auxiliary rails 299$^c$—299$^d$ may also be provided. These need be no longer than necessary to accommodate the forward movement of yoke Y$^1$ when the pistons 287 are fully extended. Standards 3 are self-explanatory.

In general, the procedure necessary for landing the hypothetical Constellation 433 need not be particularly different from the technique, or techniques, explained relative to light plane 1.

It may be mentioned, with regard to the apparatus of Figs. 1 to 4 inclusive, that the loop cord 4, as best seen in Fig. 1, is preferably at tension as shown, since it is desirable to prevent any slackness in line 300 between the pulley 293$^{aa}$ and clips 81. As a taut loop may serve to close up much of the lower portion of the same, the latter could be releasably secured to standards 3, in the position indicated by dotted lines, by provision of an additional pair of clips 81$^b$ somewhat lower down on the standards.

*Shock dampers*

References have heretofore been made to shock-damping auxiliaries; and because the same perform a function apart from the delayed-action braking devices—and inasmuch as they represent an important component of each of the landing arrangements herein—a detailed explanation of this feature has been reserved until now.

Figs. 1, 2 and 3 afford especially good illustrative material for this purpose. The light craft 1, Fig. 1, will first be considered. Boom 7, therefore, which is carried at pivot 238, has the bell crank member 239; and member 239 is pivotally connected, as shown, to the piston rod 240 having plunger 241 within shock strut or cylinder 169. Cylinder 169, in turn, is pivotally mounted at pivot point 242. Cylinder 169 may be of any standard type, pneumatic, hydropneumatic, etc., as adapted to the duties to be discharged, and may be provided with one or more bleeder vents for softening its action, depending upon such considerations as the size of said fixture, size of the aircraft, the degree of cushioning required, whether employed in conjunction with other shock dampers, etc. These, however, are details for the final determination of each designing engineer. In general, it is thought that the pneumatic "door-check" type will be preferred because of its quick, simple, automatic action.

It is apparent at a glance that when boom 7 is in the outboard position seen in Fig. 1, with piston 240 quite well extended, cylinder 169 is in readiness to deliver a maximum degree of shock-absorption by yieldably resisting the tendency for boom 7 to be jerked too quickly backward, along arc 243, upon contact of hook 6 with loop 4 of the hawser 300. Obviously if this action occurred instantaneously, a sudden severe stress might be applied at pivot 238 and a distinct shock felt throughout the airplane, notwithstanding that pulley wheel 293$^{aa}$ is freely rotatable. This is due to the fact that the inertia, alone, of said pulley when in repose must be overcome by stages, inclusive of the subsequent additional drag imposed thereon by the tension of hawser 300, the tension on drum-line 303, and the further drag represented by the inertia of piston 287 at the beginning of the landing operation.

It is thought that on light duty installations of this type, element 169 may be so dimensioned and constructed as to effectually damp out the initial shock of the aforesaid inertias in co-action with a nylon hawser and drumline. If the inertia of piston 287 must be additionally, specifically, overcome, however, this may readily be accomplished by incorporating—in the Fig. 1 apparatus— another shock-absorber which may be comparable to the device shown in the fragmental detail of Fig. 4. While the latter is disclosed with especial reference to the heavy duty mechanism of Fig. 3, its leading features will be so obvious to any skilled individual as to require no meticulous explanation thereof relative to the single cylinder 283 and piston 287, also, of said Fig. 1.

Needless to say, cylinder 169 could, if elected, be positioned to the rear of bell crank 329, in which case piston 240 would merely produce compression by pulling outwardly therefrom instead of pressing inwardly.

A secondary component of shock-absorption is automatically afforded by the arcuate movement of the boom itself. In brief, the pivotally mounted boom describes an arc which causes a geometrical slowing of the longitudinal speed of the tow-line; in this case, hawser 300. And yet another auxiliary shock-absorbing element may be incorporated in line 300, as earlier mentioned, wherein nylon cordage is employed; specifically the type of nylon having the several desirable characteristics of great tensile strength, slow elastic memory, uniformity of stress load absorption, and maximum stretch. Other recently introduced products having similar qualities may, of course, be substituted. Obviously, therefore, by the time boom 7 has traveled to position 344, ample absorptive action should be afforded to overcome each of the aforesaid initial inertias, so that dolly 294 will have begun to travel—at first rapidly—along track 292 against the thence progressively delayed-action drag of cylinder 283.

As mentioned previously relative to other variables, the degree of subsequent drag will, by suitable delayedaction, be proportional to the speed and pull of the landing airplane; but there will be a desirable automatic relaxation of tension as plane 1 is slowed and finally stopped, without any resultant final jolting action or recoiling tendency.

In special cases, other auxiliary forms of shock-damping may be employed. For example, it is possible to incorporate a shock strut in the landing boom itself, as depicted in the fragmental detail of Fig. 23. In short, the boom 7$^a$, as one of various possible alternatives, has an upper shock chamber defined by cylinder 347, within which the exceptionally sturdy piston rod 348 is adapted for longitudinal movement, being additionally supported by sleeve 349. Boom 7$^a$ also has the outwardly disposed barrel 350 within which pull-cord C, comparable to cord C of Fig. 21, is adapted for slidable movement whereby to actuate the bolt 31. All features of the lower boom, inclusive of hook 6, may be identical with those shown specifically in said Fig. 21 view.

Barrel 350 is observed to be carried from both cylinder 347 and sleeve 349, in any satisfactory manner, as by ferrules 351. In accord with the mode of operation already explained respecting Figs. 21 and 22, it is obvious that upon normal contact between the hook and the landing loop, the lower section of boom 7$^a$ associated with bolt 31 will be extended against the cushion of air— if pneumatically operable—within cylinder 347, in a reverse-telescopic manner, thereby materially further lessening the shock of the impact between hook and loop.

As the lower boom section is adapted to move substantially outward from its initial position, away from the upper portion, it is evident that pull-cord C must have more play than is required in boom 7 of Fig. 21. For this purpose, it is provided that its upper portion C$^1$, which of course should be inboard of plane 1, may be of the exact correct additional length to take up such excess when the boom is fully extended. And when said excess is so taken up, pull-cord C may then be operated to actuate hook-jaw 24 (Fig. 21) to release the landing loop in the normal manner. Cylinder 347 may, by option, have one or more bleeders 347$^a$ according to variably specific design requirements. Or any other suitable type of shock strut may be employed alternatively. Spring 347$^b$ is provided for the recovery of the lower boom to its previous position. See, also, later reference to special cross-wind booms.

Figure 4:
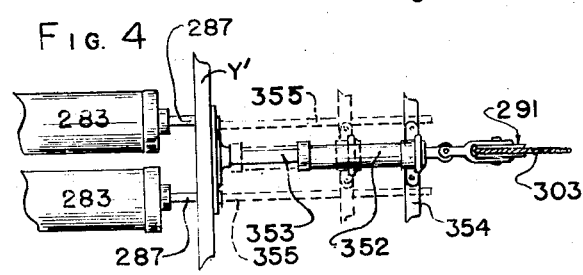

Referring again to Fig. 3, in addition to the shock-absorber 169 associated with boom 7 of plane 433, a somewhat comparable device may be desirable for overcoming the initial inertia of the particularly heavy assembly of yoke $Y^1$ and the plurality of pistons 287 associated therewith. While Duralumin or some other light but strong metal may be used for said yoke and said pistons, it may be advantageous to incorporate the shock strut 352 of Fig. 4, or its equivalent, between yoke $Y^1$ and the pulley wheel 291. In order to support the added weight of element 352, including piston 353, the cross-arm 354, also, may extend laterally for engagement, through any suitable rollers or the like, with the auxiliary tracks 299$^c$—299$^b$, Fig. 3, in much the same manner as earlier explained in reference to yoke $Y^1$. In order to reduce the weight factor as much as possible, however, it is though that ample support for elements 352—352 may perhaps be afforded by a pair of elongate pins or rods 355—355, which can be carried from yoke $Y^1$ as shown and may engage holes dimensioned therefor in member 354; which latter, in that event, need be no larger than approximately as shown in Fig. 4.

Obviously, when tension is applied to drum-line 303, shock chamber 352 will begin a forward movement against the pull of piston rod 353, and the latter, in turn, will progressively exert a sufficient tug against yoke $Y^1$ to cause piston members 287 to start moving forward. And thus, by the time all shock dampers have amply compensated for the initial impact of the snatch-tackle, the delayed-action drag of cylinders 283 will have begun to take effect, in first progressively slowing and thence landing and stopping plane $1^y$. As considerable pressure will be exerted against the inner walls of cylinders 283— particularly during the landing of large airplanes—these will naturally be made very ruggedly. And shock strut 352 may be the full pneumatic, hydro-pneumatic, or any other serviceable type for the duties explained.

There is, incidentally, at least another optional type of outboard tackle which may be employed, as shown briefly in the form of grapnel 356, in phantom outline, and dragline 357 of Fig. 1. Such alternative tackle will be largely self-explanatory to skilled operatives; and since not specifically claimed in this application, the same is not fully graphically shown or described.

*Cross-wind versions*

It has long been recognized that one of the main obstacles to non-commerical flying and to the ushering in of a so-called air age—wherein the personal airplane would begin to enjoy a status comparable to that already occupied by the automobile—resides in the problem of providing adequate landing and take-off depots for small craft.

Such an era calls for countless numbers of relatively small, low-cost "airstrips" which can be operated without conflict with the large commercial airports. The most economical arrangement, theoretically, is a relatively narrow one-way airstrip. But the major drawback to the attainment of this goal is the difficulty of landing light planes safely on such one-way strips—and of launching them therefrom—irrespective of the prevailing wind currents.

Among the difficulties heretofore encountered is the inherent proneness of light planes, especially, when equipped with so-called "drift gear" of the prior art, and when decelerated by standard braking devices, to ground loop during landings against even ordinary cross-winds. Other troubles have arisen without reference to the braking factor, as will be explained hereinafter.

Although the matter of cross-wind landings and take-offs is especially vital in its relation to lightplanes, and to landing and take-off surfaces therefor, the development of a thoroughly efficient, foolproof cross-wind landing apparatus is by no means concerned solely with light craft. In fact, with the advent of jet and turbo-jet propulsive types of power plants, accompanied by higher and higher present and anticipated speeds for landings and take-offs, and with numerous projects under way to construct large aircraft capable of at least high subsonic travel, there looms the ever increasingly serious problem of providing adequate runways at the major airports.

Hereafter I shall endeavor to point out specific, inherent reasons why the desired results cannot be accomplished, in all probability, by any mechanism limited solely to existing cross-wind landing gear—such as drift undercarriages according to patents currently of record. At the same time, I shall endeavor to show how said results can be readily achieved, and greatly exceeded, by the augmented system set forth herein. In short, by incorporation of both a cross-wind landing gear component and a safe and rapid aircraft decelerating component, including automatic braking and control components, it should, henceforth, be possible not only to reduce existing large airfields to one-way strips, but the latter can perhaps be further reduced to a fractional portion of the runway length heretofore envisioned.

Thus if, as claimed by the proponents of one well known catapulting device, "The Electropult can launch the largest airliner existing at a speed of 120 miles per hour in a distance of 500 feet," then no airport runway proper need be over 500 feet long, by contrast with existing runways up to 5,700 feet and more in length, since such an airliner can now also be safely, efficiently landed and stopped within a shorter space than would be required for its take-off. Data concerning said "electropult" may be had by consulting Patents 2,404,963; 2,404,964; 2,404,984; 2,412,511; 2,418,572; 2,412,513; 2,412,514 and 2,412,515.

In short, assuming that the much less difficult matter of cross-wind take-offs can be amply taken care of by devices comparable to the aforesaid launching apparatus, it will shortly be made clear that the landing of aircraft—including lightplanes—against exceptionally high cross-winds, and without regard to the wind direction, can also be rendered a thoroughly safe, automatic, and foolproof procedure.

Regardless of the wind direction, and notwithstanding cross-winds blowing at velocities which ordinarily would render landings thereagainst extremely hazardous, with or without existing drift gear, it is believed that the further modified apparatus of Figs. 5 to 20 inclusive holds the answer to safety landings on one-way lanes within a theoretical minimum of roll-off and with a desirable maximum of ease, comfort and accuracy.

*Full boom types*

To those who are conversant with existing "drift gear," it will be apparent at a glance, and in view of the previous descriptions, that the boom and tackle combinations hereafter referred to could readily be utilized in cooperative assembly with present undercarriages. To do so need involve little more improvisations than such a detail, for example, as correctly mounting the boom (and/or halter components hereafter explained) with respect to the center of rotation and to certain structural features of the aircraft. Such combination would automatically overcome most of the difficulties which have been seemingly incurable heretofore—in an aircraft per se, that is.

The inflexibility of the most publicized prior art devices, and especially the feature of rigidly locked main landing wheels, places an unnecessary burden upon the pilot in many ways. Moreover, much of the needless, more costly instrumentation, which is apparently indispensable on existing, unassisted undercarriages, can be replaced to great advantage by apparatus of a different and simpler class, having different specific functions.

Before detailing my basically different cross-wind landing gear and aerodynamic controls, which are preferred in conjunction with my other landing components, the latter will be the more readily understood if explained first.

Referring to the airplane $1^b$, Fig. 5, it may be assumed that said craft already has touched down on the one-way strip defined generally by the right and left marker lines 435—435. Plane $1^b$ is especially distinguished—from most existing airplanes—as having a cross-wind undercarriage which includes the right and left landing wheels 436 and 437. While axially misaligned in this particular relation, wheels 437—437 are rolling on a common parallel path along the one-way strip 438, as defined by said marker-lines, while the main body, including the wings, of plane $1^b$ is crabbing at an oblique angle thereto; that is, slued somewhat around toward the direction of the cross-wind; the latter, at a full right angle to the runway, being generally indicated by arrows 439. For present illustrative purposes, plane $1^b$ has also the nose-wheel 440. For similar reasons the craft is, for the moment, assumed to be a typical small airplane except for said cross-wind equipment. Such an aircraft, ordinarily, would be in an extremely vulnerable attitude during a landing and decelerating operation especially, since, depending upon the force of the wind and its direction, it could readily go into a loop with either of wheels 436 or 437 serving as a pivot therefor.

In this view, however, plane 1ᵇ has auxiliary anti-looping gear including a cross-wind type of landing boom 441 bearing hook 442; said boom being carried from a primary support 443 on the underside of the fuselage 444, which support may be located in any preferred position after determination of such variables as the center of rotation of the airplane. Boom 441 is mounted for both vertical and lateral swingable movements, and the latter movements are adapted to be restrained, in this illustration, by at least one spring 445 having an anchor point 446 and connected also to the boom assembly, as shown, at the end of arm 447. Elements 447′, 504 and 505 in Figs. 6 and 7 will be explained later in relation to Figs. 15 to 20 inclusive.

A clearer, more detailed view of the general boom assembly, including certain related accessories, is afforded by Fig. 6, which assembly is identified as being one of various possible embodiments. Thus it is therein apparent that the aforesaid primary support is the hub-like bearing-and-sleeve member 443, anchored to fuselage 444 in any serviceable manner. Member 443 includes the inner rotatable, axle-like carriage member 448 having said upper arm 447 connected, as shown, to said spring 445. Boom 441 is also suitably controlled—for vertical movements—from shaft 449 as indicated; and said swingable movements, against the tension of spring 445, is obviously afforded by the relatively limited rotation of member 448, as actuated by variable tensions adapted to be exerted on the hook and boom elements through the medium of hawser 5 and loop 4, as in Fig. 38. Hawser 5 may be substantially the equivalent of element 300, Figs. 1 to 4, and is normally connected to instrumentalities for automatically decelerating and stopping the plane 1ᵇ, such as the apparatus of Figs. 1 to 4.

The means, and its exact location, for actuation of shaft 449 is subject to possible variation, depending upon the particular positioning of support member 443 in respect to the center of rotation and other factors. Final determination of these matters, however, is a simple problem of direct engineering and the rough schematic lay-out of Fig. 5, in view of other data herein, will be quite adequate for the purpose. It is thought that for the ends in view the most advantageous location for member 443—perhaps the precisely proper location—will be at or approximating said center of rotation and, in that event, substantially farther forward than indicated in the drawing; the object being, of course, to effectually guy plane 1ᵇ against any possibility of either a ground-loop or a nose-over, having in view both cross-wind and into-the-wind or with-the-wind types of landings, and this end result is accomplished automatically by the restraining tug—the bridle effect—of the hawser 5, yieldably resisting the forward movement of the undercarriage on the one hand and, on the other, positively stabilizing the antagonistic forces of the respective wheel and wind components in respect to the body and wings of the airplane.

Although it is felt that if all features of the apparatus are correctly designed, the likelihood of landing mishaps will be completely obviated, it is apparent that ailerons 450 could also be operated (if at all required) to correct any looping tendency, and, to be sure, elevators 451 and/or flaps 452 could be employed for auxiliary control if in the least needed in addition to the coaction between the rudder and the landing gear as later explained. Overbraking, however, a fruitful cause of nose-overs, or wheel braking of any kind, is of no concern to the pilot of plane 1ᵇ since braking is supplied automatically from the deceleration mechanism and not at wheels 436—437 for such landings. It is equally clear that, lacking such decelerating means on an aircraft, and the auxiliary station mechanism, the pilot has no alternative but to apply wheel braking as best he can regardless of the surface conditions: as, for certain examples, on icy, muddy, or other slippery runways.

By expert predetermination, the operation of all airfoils which are not controlled from the boom assembly, as clarified hereinafter, could be made automatic in co-action with the autopilot, if employed; and wherein a temporarily different coordination therewith might be desirable in cross-wind landings, as such, suitable adaptation therefor may be readily made.

Returning to Fig. 6, shaft 449 may be rotated in various ways, as intimated, but one practical means therefor is shown in the servomotor 453, having worm 454 to engage gear-wheel 455. Such an arrangement, however, is to be regarded as largely schematic, and in practice it may be preferred, for example, to mount motor 453 on top of member 448 (inboard, that is) with worm 454 pointing downward therefrom to engage wheel 455 in an upside down relation; and wheel 455, for another example, could be a sector only. Such an assembly is not here indicated, in order to avoid obscuring certain other features thus more clearly shown. Vertically arcuate movements of boom 441, when driven by motor 454, may of course be very exactly predetermined; and such movements can be manually effected by remote control from the cockpit, if desired on simple inexpensive installations, or the same may be actuated automatically in such desirable ways as elsewhere suggested herewithin.

The at least one potentiometer element 456, including wiper 457, illustrates a possible hook-up with the boom assembly of Fig. 6 whereby, among obvious options, boom 441 may be initially lowered automatically to the pre-landing attitude, as shown, by radionic control for example, via pickup 458 and motor 453, inclusive of such amplifier means 458′ as required therefor. This could occur, for instance, when plane 1ᵇ arrived at a predetermined low altitude on the approach or at a particular area of glide path; and such actuation could, by option, also lower wheels 436—437 and 440.

Hook 442, Fig. 39, may be similar to the detail of hook 6 in Figs. 21 and 22, inclusive of inboard means, as required, for actuation of pull-cord C, as was earlier explained. However, in the absence of shock-strut 459 to be shortly explained in connection with Fig. 7, the boom 7ᵃ of Fig. 23 may be here utilized, since it carries its own shock absorber within the upper telescopic shank of the boom itself.

The assembly of Fig. 6 may be altered according to Fig. 7, which features the shock strut 459, and which latter is carried from the frame 460, having—in this particular view—two triangular sides as generally indicated, to support the pivot member 461 and said shock strut therebetween. Frame 460 is supported above the carriage 448ᵃ, which is swivelly mounted as indicated within the support 443ᵃ. In this version, carriage 448ᵃ is an annular collar or sleeve-like device which allows of free movement therethrough of the bell-crank arm 462 of boom 441ᵃ. Obviously, the normal sudden up-whip of the boom would be eased and cushioned by the downward stroke of piston-rod 463, and the extension of rod 463 would continue to a hypothetical low point of movement of crank 462 as indicated by phantom 462′.

However, according to one option, it is readily possible to utilize element 459 both as a shock-absorber and as a means for controlling the boom 441ᵃ pneumatically, hydraulically or hydro-pneumatically—as see hose line 464. The required arrangements therefore are so elementary as to require no detailed explanation to those skilled in such matters. In view of the data already given in regard to Fig. 6, other features of Fig. 7 are largely self-explanatory, inclusive of arm 447, potentiometer 456, wiper 457, amplifier 454 and servomotor 453ᵃ, the belt drive being of course entirely schematic. If boom 441ᵃ is to be motor driven, as in the manner of boom 441 of Fig. 6, the pivot pin 449ᵃ may be extended laterally to form a shaft 449ᵇ, and a motor 453, for example, could then be mounted for coaction therewith in the manner which was explained relative to gear wheel 455 and worm 454, as best seen—looking upward from below the fuselage—in Fig. 8.

In Fig. 8 a sufficient number of the elements of Fig. 7 are readily identifiable, by like numerals, for explanatory purposes. Phantoms 441′ and 441″ indicate variable right and left positions of boom 441ᵃ according to the restrained and hence relatively limited rotation of carriage 448ᵃ. See also later reference to Fig. 20.

As for the specific control means required for actuating various elements of Fig. 5, such as the landing gear, airfoils, landing boom, and the propulsion motor 465, these are old and well known. Wherein, by preference, automatic equipment can be installed throughout, the usual procedure is to employ an automatic pilot 466, which may have suitable hook-ups with the control panel 467, propulsive thrust motor 465, potentiometer means 468 (and 468ᵃ, for boom 441), including amplifier mechanism 469 as required, as well as a complement of individual servomotors (not shown) for actuation of the rudder and the elevators, the ailerons, landing gear, etc. No effort has been made to show all such instrumentalities in detail, however, or even fully schematically in the relatively small view of Fig. 5 except in such terms as to clearly visualize one optional plan of lay-out. And see also the later references to direct actuation of certain of the landing and/or take-off controls, as explained in connection with Figs. 15 to 20 inclusive.

From the foregoing, and in view of techniques previously, hereafter, and copendingly dealt with it will be elementary to those well versed in cross-wind landing procedures to carry out a typical landing operation.

In brief, the airplane 1ᵇ may be electronically homed to describe a glide path such as will cause the hook 443 of boom 441, for example, to engage loop 4 of the hawser 5 carried in any suitable manner, as heretofore explained with reference to hawser 300, in the path of said hook. This action automatically tethers the airplane to the decelerating apparatus; and aside from the fact that a cross-wind landing is being made, the general preliminary steps will not vary greatly from those explained in relation to Figs. 1 to 4. It is sufficiently obvious that the first movement of boom 441 will be vertically-arcuately downward to the position indicated, for example, in Fig. 6, ready for the "strike" or snatch; and that quickly thereafter the boom will swing laterally against the tension of hawser 5; and, with wheels 436—437 and 440 coordinated therewith in readiness for the roll-off down the one-way strip 438 (wheel 440 having the so-called and well known Maclaren type of override if desired, but not necessarily as hereafter explained), the remainder of the plane may describe any required crabbing movement partially to windward as indicated.

Whether this movement should always occur fully before or partially after grounding contact, and whether plane 1ᵇ should crab fully at the correct angle toward the windward side—arrows 439—or should be held on more of a compromise course by the automatic action of the boom are matters which can readily be ascertained by those professionally qualified for such purely operational details.

The dragline tackle 471 briefly indicates one possible alternative arrangement wherewith it may be desired to operate according to the techniques and apparatuses described in respect to elements 356 and 357 of Fig. 1. A preferred form of dragline, or so-called halter, however, for use in cross-wind landings, will now be explained in relation to Figs. 9 to 14 inclusive.

*Boom-and-halter variants*

Plane 1ᶜ, Fig. 9, has in addition to a cross-wind undercarriage, inclusive of wheels 436–437 and 440, the modified landing boom 441ᵇ. Boom 441ᵇ is adapted to carry the detachable hook 472, which is secured to one end of the halter line 473 in any preferred manner, as by means of an eye 474. In this view the hook is shown in the detached, operative position, but in its idle, inoperative position it may, according to one preferred arrangement, be socketed to one end of the boom as at location 472'. In this more simplified assembly, it is not entirely necessary for boom 441ᵇ to be swivelled for lateral movements—as particularly required of booms 441 and 441ᵃ in Figs. 5 to 8 inclusive—since its main function is to carry hook 472 in readiness for landing engagements, as will be explained shortly, and to swing the hook away from its normally idle location, position 472', to that location which will best facilitate its contact with station apparatus complementary thereto. (However, see later reference to Fig. 18 with regard to swivelling such a boom for unassisted take-offs.)

More specifically, the hook is carried to normally engage the terminal portion of a landing hawser, which action may be comparable to the techniques earlier explained relative to hook 6 and loop 4, exemplified by the taut loop 4 of the hawser 5. The instant such an engagement has been made, the hook is freed from the boom and is thereafter appendent from hawser 5 and the latter carried from a suitable anchorage which enables said hook to swerve to either right or left of the plane's longitudinal axis—to the right in Fig. 9—according to the direction and force of the cross wind and its effect upon the partly-to-windward attitude of the airplane following contact with said hawser.

Obviously, means must be provided for readily freeing the hook from the boom. Among the numerous available options therefor, the illustration shows one satisfactory contrivance which has a three-fold advantage, namely of (1) securely anchoring the end of halter 473 remote from the end thereof which carries hook 472, (2) affording a very brief pay-out of halter 473 from the anchor point, allowing the socketed portion of the hook to quickly clear the boom end under the required tension, and (3) providing a highly desirable component of initial shock-damping, whereby the initial tug of hawser 5 against plane 1ᶜ via said hook and said halter may be largely dissipated until other inertias of the landing mechanism have been equalized and balanced out. These features are all incorporated in the composite arrangement called anchorage 475, including any satisfactory anchor base 476 securely affixed to the airplane, a shock-cylinder 477 secured to base 476, and the piston-rod 478 having the eye member 479 or the like adapted to connect with a terminal of halter 473 substantially as indicated. This connection may be made with a thimble or in any other preferred manner.

As shown in the detail of Fig. 10 and more fully explained hereafter, the halter line passes from eye 479 over a pulley wheel 480, and thence downward to lower pulley 480ᵃ, and through the escapement member 481 located, by preference, just below the fuselage skin and desirably streamlined thereto on the side sloping forward. Such an escapement device should permit every required freedom of play for both inboard and outboard sections of the halter, especially the outboard section in whatever attitude plane 1ᶜ takes relative to a right or a left crosswind. The final escapment for halter 473 may be provided for in various ways, as by provision of a bearing device exemplified by the ball-bearing arrangement 94 of Fig. 14, comprising the bearing members 392 within a housing 383, wherein the line 5' of said view is comparable to halter 473 as it would appear from below the fuselage, but, as previously explained, with element 481 swingably mounted slightly therebelow and preferably pointing aft with the aforesaid forward contour. Needless to say, member 481 would occupy the exact desirable position in respect to the center of rotation since the tension—according to this version—would be imposed directly thereagainst and only indirectly against anchorage 475.

*A simplified structure*

With further reference to Fig. 10, certain of various options will now be explained. First, it is apparent that the anchorage 475 need not, necessarily, be up forward as first seen in Fig. 9, wherein the shock cylinder 477 and piston-rod 478 are pointing co-longitudinally and in line with boom 441ᵇ. In fact, for better space utilization, it may be desirable to mount said cylinder substantially as illustrated in Fig. 10, with pulley 480 in line with rod 478 and eye 479 as indicated, whereby the halter 473 is adapted to be carried out through said escapement member 481 in the manner already explained.

In this drawing boom 441ᵇ is assumed to be in the lowest outboard position just before its hook 472 engages the suspended cross-cord of loop 4, said cord being here presented at a slightly oblique angle in order to more clearly indicate relationships. One, only, of a pair of suitable standards is shown. (It is, incidentally, obvious that the universal ball element in this hypothetical structure makes it possible, by option, to merely provide a deeply slotted holder for loop 4 instead of the clip here shown.)

It is clear that in this position the halter 473 may extend downward to its lower terminal connection with the eye 485 of hook 472. As this eye is desirably to the rear of the hook, halter 473 will merely hug one side of the boom shaft as generally indicated; that is, according to this particular version, wherein member 481 is assumed to be forward of the boom suspension.

By option, however, and without moving member 481 from its desirable position at a central location on the lower fuselage, and with respect also to the center of rotation, the same could be positioned to the rear of the boom suspension, as at phantom 481', whereby halter 473 would be at the outboard position 473' and would connect with eye 485 from the rear of the boom hook. According to this alternative, it would be desirable to use an offset boom mounted well forward. In view of possible operative difficulties, however, the boom arrangement of Fig. 18, to be described later, is thought to be preferred.

According to the first mentioned design, boom 441$^b$, in its retracted position within a suitable lower groove therefor, would appear substantially as shown by phantom 441$^d$. Phantom 473$^a$ indicates the position of the halter relative to fixture 481, hook 472 and loop 4 after said hook has engaged said loop and has been jerked from the boom socket—to be shortly explained more fully in relation to Fig. 11. As indicated, the cylinder 477 may have an internal spring 477$^a$ mounted to yieldably oppose the pull against rod 478 and operating to retract said rod upon removal of tension on the halter line. Certain further features of element 477 are reserved for explanation in specific relation to Fig. 18 hereinafter. Base 476 of course (Fig. 10), may be undercut to straddle the boom slot according to this particular option.

Incidentally, while not shown as a preferred arrangement but rather as emergency tackle for military planes, or for civil airplanes wherein it may be desired to incorporate such a feature, it is readily possible to equip plane 1$^b$ with an automatic winch 489, having a hawser 5$^y$ payable therefrom to pulley 480 (instead of the assembly including cylinder 447) and thence to the boom hook through fixture 481, whereby the retarding apparatus is carried on the aircraft. Moreover, such a winch could be carried for emergency use only, in addition to cylinder 477 for standard landings.

Stand-by tackle of this general type could be used for emergency landings on any suitable open terrain by quickly setting up a pair of station poles of the airmail pickup type, having a loop suspended therefrom and a very short hawser secured to a satisfactory natural or improvised anchor.

The pulley wheels 480$^a$—480$^b$ in Fig. 9, including belting therebetween, represent any desired means for operating boom 441$^b$; and it is apparent that the same could be lowered manually by means of a lever (as see the lever device on the pickup boom in Patent No. 2,373,414 to S. C. Plummer) or according to other options including motor means. If desired, the boom could be automatically lowered by electronic actuation. See also the lever-and-boom element in my co-pending application called "Burden Switching Apparatus, Including Methods Therewith," Serial No. 707,151, filed Nov. 1, 1946.

Boom and hook variables

It would be futile to attempt to indicate, in any one embodiment, the sundry variables which may be employed in connection with the boom and halter assembly of Fig. 9, as each designer will inevitably have personal preferences in this respect; and the possible alternatives within the general scope of my concept are without limitation. One other desirable type will, however, be described later in connection with Fig. 18.

As for hook 472, this element is also subject to variation. Some idea of the possibilities may be had from an examination of said patent to S. C. Plummer as well as to such other Plummer issues as No. 2,373,413; and yet other serviceable types of detachable burden hooks are disclosed in Patent No. 2,359,275 to Rexford O. Anderson. In the Anderson patent, for example, three styles are shown, in one of which styles the hook is released from its boom upon contact of the burden loop with a latch member spring-hinged to the hook jaw and adapted to be struck back out of contact with mechanism-including optional electric control mechanism to the winch motor—which frees the hook for escape off the end of the boom. In another version therein, a latch element is pivotally carried in such manner as to positively cam the hook from the boom when said latch is struck by the burden loop (or, rather, vice versa); and, in a third version, a trigger within the innermost jaw area of the hook actuates mechanism to release the hook from the boom when depressed by said burden line. By relatively simple adaptations, as required, any of the aforesaid hooks (excepting said second named Plummer type) may be mounted on boom 441$^b$; but the same may also be said of the detachable hook featured in my previously mentioned co-pending case, serially numbered 707,151.

Thus, for one sufficiently clear illustration of this particular element, and as already partially explained, I show the detail of hook 472, Fig. 11, as being very similar to the one last previously referred to. That is, hook 472 has the jaw 483, a shank or neck 484, an eye 485 and an optional latch 486. Jaw 483 is preferably formed with an upper cupped area 483$^a$ and a lower cupped area 483$^b$. Therefore, when the cross-cord of loop 4 impinges against the lower shank of the boom, said cross-cord will be automatically deflected first to the upper cupped area, as at the upper end of phantom 4$^x$; which action will then automatically jerk the hook, including boom 441$^b$, upward and backward arcuately. As soon as the loop 4 exerts a straight-on pull co-longitudinal with boom 441$^b$, and before the halter is at location 473$^a$, Fig. 10, neck 484 will be jerked free from the tempered spring clip 487 and free of its socket in the boom-end as shown, permitting loop 4 to reorient itself downward into the position indicated at cupped area 483$^b$.

It is obvious, too, that the halter 473 will be jerked to tension against the yieldable shock-rod 478, Figs. 9 and 10, which same will move relative to cylinder 477, thereby expediting the release of the hook by the limited extension of the halter as was previously explained. The hook will now assume a position in the line of tension whereby the pull thereon will no longer be transversely cross the hook-jaw but co-aligningly between eye 485 and lower cupped recess 483$^b$. In short, along the broken line 488.

Following these sub-operations, which will occur instantaneously, halter 473 will assume in general the position seen in Fig. 9 relative to the airplane proper, and the boom can now be quickly retracted (automatically, by preference) back into its belly-groove by suitable means adapted to operate it in reverse to the lowering operation. Operation of ailerons 450—450 and/or elevators 451 and/or flaps 452 may be in accord with the functions of like features of airplane 1$^b$, Fig. 5, as and if required relative to the wind-component indicated by arrow 439. Wherein it would be desired to operate any of the boom and/or landing gear controls, and/or flight controls, and/or propulsion motor controls automatically, such operations could also be performed according to hook-ups previously explained.

In this connection, means is optionally provided for direct electrical actuation of any one or more of the motor controls of plane 1$^c$ coincidental with the detachment of hook 472. This, as in Fig. 11, is provided in the form of an electric switch 490 with wires 490$^a$—490$^b$ connected thereto. Actuation, through this fixture, will be quite clearly understood by reference to the like feature in said patent to Anderson, No. 2,359,275, but the same is thought to be sufficiently self-explanatory.

One use of switch 490 could be merely to actuate a servomotor, similar to motor 453 but not shown in Fig. 9, causing boom 441$^b$ to retract automatically upon relinquishment of hook 472. A reversible type of worm and motor combination may, of course, be employed for rapid retraction of the boom.

A typical operation

From the foregoing data, and in view of techniques and apparatus earlier detailed, the operation of palne 1$^c$ will be self-evident. One mode of procedure, however, will be given briefly, and, for purely illustrative purposes, the engaging and decelerating mechanism of Figs. 1 and 2, complemented by Figs. 3 and 12, is chosen. This differential type of apparatus has already been fully explained, but since, in Fig. 1, the oversize pulley wheel 293$^{aa}$ has only the guard 307 as a retaining means for the outboard portion of hawser 300, it is felt that for cross-wind landings especially—wherein plane 1$^c$ may not at all times maintain a substantially straight course along runway 438—the small sheave-dolly 493 of Fig. 12 is to be preferred.

Sheave-dolly 493 includes the body member 494 bearing a plurality of small sheave-like wheels 495, two to the side substantially as seen in this view from above, and each of wheels 495 travels along complementary trackage disposed on respective sides of the slotted travelway 306 and normally, desirably, directly therebelow as more clearly indicated by the fragmental view of Fig. 13. That is, wheel 495 engages the subway track 496 and a like wheel directly opposite therefrom engages a similar track 497 (see Fig. 12); there being, of course, the companionate other two wheels of said sheave-dolly, as shown. Element 306', obviously, is one side member defining the slotway 306.

Body member 494' bears the preferably swivel-mounted duality of smaller sheaves or pulleys 498 through which hawser 300 is adapted to pass after leaving the grooving of the oversize drum pulley 293$^{aa}$; and the sheave-dolly entire is further carried, as its primary support means, from the main dolly 294 therebelow, as, for example, on a suitable extension of the decking 296 and directly ahead of drum pulley 293. According to this option, of course, guard 307 of Fig. 1 is not required. It is quite apparent, according to explanations given heretofore with reference to this particular form of landing mechanism, that where landings occur straight down the airstrip 438, wheels 495 will bear about equally against the trackage 496. But wherein plane 1$^c$ may, in the course of the roll off, tack to either the right or the left of travelway 306, the right front sheave wheel, contacting track 497, will cooperate with the left rear sheavewheel bearing against track 496 to equalize the side component of the burden load . . . and vice versa for a tacking operation to the left of the travelway.

Where sheave-dolly 493 is employed, it is apparent that all parts of the general dolly assembly 294 may be below the level of the landing surface excepting element 498.

Thus when airplane 1$^c$ engages loop 4, Fig. 10, through the agency of hook 472, said hook will become almost instantaneously detached from boom 441$^b$, the loop—having straightened out and become a component in the train of tension leading back to drum pulley 293$^{aa}$ through hawser 5 (hawser 300 of Figs. 1, 2 and 12)—previously exerting a sufficient pull against the halter 473 to free said hook from said boom. This sub-operation, of course, was accompanied by a limited protrusion of piston-rod 478 from shock cylinder 477, the full assembly 475, Fig. 10, having become the anchorage for tethering plane 1$^c$ yieldably against the subsequent progressive delayed action braking through differential drum 293$^b$ and, thence, back through pulley 291, Fig. 1, to the master shock cylinder 283 as was previously related relative to airplane 1 and position 1$^x$. Obviously plane 1$^c$, when thus decelerated, may complete its landing and roll-off in the general manner explained with reference to plane 1$^b$.

As was explained in connection with Fig. 1, the boom 7 therein may, in lieu of hook 6, be adapted to carry a grapnel 356 at the end of a short length of dragline 357, enabling the grapnel to be trailed below the boom end for engagements with loop 4—thereby affording a greater tolerance than is required for the more precise hook engagements. In view of this disclosure and the cross-wind apparatus on planes 1$^b$ and 1$^c$, it becomes a simple procedure, by option, to employ such a dragline 357 in similar coaction with the cross-wind boom 441 or, more desirably perhaps, with boom 441$^b$ for attachable and fully detachable relations therewith in a manner comparable to the operation of halter 473. Thus, in lieu of the hook neck 484 and the boom socket as retaining means, such a dragline could be merely clipped releasably to the boom in any satisfactory manner and, in other respects, operable in the same way as said halter.

As explained heretofore, my cross-wind landing apparatus, in its preferred embodiments, is operable according to a different basic principle from that employed in the prior art, wherein the full burden of steering and braking, including sundry preliminary duties, is still incumbent upon the pilot of the aircraft.

According to the system herein, such sub-operations are, obviously, made largely or entirely automatic, eliminating both guesswork and the necessity for precisely and continuously coordinating the movements of the airplane, by pilot operated controls, with the fickle and changeable cross-wind directions and velocities. These operations will be more clearly understood after an explanation of the devices featured in Figs. 15 to 20 inclusive.

*Hook-actuated structures*

In the diagrammatic view of Fig. 15, the airplane 1$^b$ is presumed to have the regular complement of landing gear, such as main wheels 436—437 and the nose wheel 440, the latter, only, being here shown. Each of these wheels may have any preferred standard type of suspension to include a preferred kind of shock-absorbing means; but they are also swivel mounted and at least the subsidiary wheel 440 may be but is not necessarily castered. Indeed, the override feature of the prior art is also entirely expendable but may, by option, be included for pilot-controlled operations without essential reference to assisted landings or take-offs.

Wheel 440 is adapted to be steerably moved to right or left responsive to the automatic master control of boom 441, to be further explained, by means of the two-way lever 499 associated with said wheel and the complementary two-way lever 500 associated with said boom. Such control, of course, is made possible by interlinking means therebetween conveniently indicated by cables 501 and 502, which are suitably secured to respective lever members substantially as shown. Wheels 436 and 437 both have similar two-way lever members, it being only necessary to show the lever member 503 of the left main wheel 436 in the detail of Fig. 19. (Or see Fig. 18.)

With reference now to both Figs. 15 and 19, it is apparent that in addition to the retaining spring 445 (see also Figs. 6 and 8), which is connected to arm 447, there is additionally provided a lever arm 447' bearing thereon a fastening means 504 similar to like means 505 on arm 447 whereby the respective control cables 506 and 507 are secured for actuation by the laterally swingable movements of boom 441. And such movements, obviously, will automatically actuate the main wheel 436 for corresponding movement by reason of the connections 508 and 509, which make fast the left terminals of cables 506—507 to lever member 503. Similarly, there are right hand cables 510 and 511 connected to arm 447 and lever 447' at the equidistant points 504 and 505 and leading therefrom to like right hand terminal connections (not shown) associated with wheel 437. Wheel 437, to be sure, will be thus positively actuated and its directional movements also controlled automatically by the aforesaid movements of the boom, as explained in respect to wheel 436. That is, both wheels will track in parallel relations and both will also track automatically in parallel coordination with the subsidiary wheel 440 by reason of the aforesaid cables 501 and 502, having fore and aft terminals respectively anchored to the fore and aft two-way lever members 499 and 500, as best seen in Fig. 15.

In one optional arrangement, cables 501—502 are additionally connected to the rudder bar 512 or its equivalent, approximately as indicated at points 513$^a$—513$^b$, so that rudder-bar actuation may, as elected, be pilot applied particularly to wheel 440, for steering said wheel; and in order to incorporate an override, if used, between wheel 440 and the remainder of the rolling gear, those sections of lines 501—502 which are between said rudder-bar and the two-way lever member 500 may include the right and left relief springs or the like 514—515, which are more clearly seen in Fig. 19. Other forms of override, if used, are optional and if desired for any reason the coil spring arrangement within the shock housing of the subsidiary element may be employed with required minor adaptations for coordination with the assembly of Fig. 15.

It is evident, however, that a like result may be had through spring reliefs 514—515 and that these less complicated, less expensive elements may have any predetermined tensions required for the override on wheel 440 without inducing equalized action between said wheel and the main landing wheels. This, of course, is additionally prevented by the overpowering tug action of boom 441, which is naturally under greater tension through loop 4 of the hawser line than the force merely required to move said rudder-bar against elements 514—515; said override, as mentioned, being understood as entirely optional.

It is desirable that the train of control initiated by, and variably automatically maintained, through boom 441 shall extend not only between rudder bar 512 and the rudder 516 but, via said rudder-bar, between the rudder itself and wheel 440; and this can be readily accomplished by means of the right and left control cables 517—518 having terminals connected to the rudder control-lever 519, and also to rudder bar fixtures 520—521, thus by option by-passing the boom lever 500. However, by another option, those sections of cables 501—502 intermediary of rudder bar 512 and two-way lever 500 could be dispensed with, the rudder cables 517—518 being direct-connected to the right and left sides of lever 500, and, for an optional override between the rudder bar and wheel 440, the spring reliefs could be placed between said wheel and said rudder bar. This would afford independent steering through the so-called rudder-bar but rudder actuation per se would then be entirely controllable by boom 441.

According to the first mentioned arrangement between cables 517—518 and lever 519, coaction between the (optionally) steerable subsidiary wheel 440 and the (essential) rudder 516 becomes synchronous, via said rudder-bar 512, whenever it may be elected to employ the override.

The assembly of Fig. 15, while showing one optional arrangement, is to be considered merely as a variable means relative to each of the particular elements thereof, since the number of possible modifications is without limit. This is well indicated further, for example, by the comparable but different assembly of Fig. 16; which latter is largely self-explanatory in view of the description of the Fig. 15 detail. In brief, in this Fig. 16 version the wheel 440 is automatically master-controlled from boom 441 through the two-way slotted crank 522, so that, whether said boom swings to the right or to the left, wheel 440 will be correctly coordinated therewith by reason of the slidable movement of pins 523 and 524 within slots 525 and 526. Two-way lever 499' is similar to lever 499 of Fig. 15 and the function of lever arm 527 is quite obvious.

The remainder of this control assembly, as indicated, may be substantially the same as seen in Fig. 15; it being obvious, however, as schematically suggested at the broken away portion of rudder bar 512', that this member is mounted for movement independently of the crank 522 although, if desired, they may have a common support.

Other equivalents

Another of sundry possible equivalents, each of which might be preferred under certain service conditions peculiar to particular aircraft, is shown in Fig. 17; this view being mainly distinguished by the provision of a duality of sprocket wheels 528 and 529 associated respectively with the mounting of boom 441 and with wheel 440, around which sprocket wheels is trained the chain 530. The wheels 528—529 are of equal diameter for equilateral movements of wheel 440, according to the right and left lateral motions of boom 441. Rudder-bar 512" and other elements of Fig. 50 may be substantially according to the previous versions, wherever similar hook-ups are possible; but in this variant, if the override is to be employed, it is thought preferable to utilize the coil spring 531, which is normally contained within the shock mounting of wheel 440 for independent actuation of this member approximately as taught, for example, in Patent No. 2,222,850, (which see for details).

The options shown in Figs. 15, 16, 17 and 19 are applicable especially to such boom-and-hook assemblies as was first described in relation to plane 1b; but comparable adaptations may readily be made for structures having combinations of boom and halter tackle, as on plane 1c. One such arrangement is given in Fig. 18, the craft there shown being conveniently identified as an airplane 1c. Thus the main boom and halter components having been earlier described with regard to Figs. 9 and 10, the more detailed control hook-ups will now be considered relative to said Fig. 18 view.

As it is desirable to fully coordinate the halter components, including member 481, with controls operable to actuate the landing wheels and the rudder, and with a suitable override, if used, between the rudder-bar and the subsidiary wheel, assembly 475 is here indicated as including the shock cylinder 477, the latter, in turn, being mounted on a suitable base—see description concerning Fig. 10—and having the piston rod 478. To the free end of rod 478 is secured the inboard terminal of the halter line 473, substantially as shown, and halter 473 is thence carried over the suitably supported upper pulley 480 (see also Fig. 10) and thence normally downward through the open neck of the escape member 481, having both an inboard portion and a lower outboard portion as explained before. Halter 473, as also mentioned earlier, passes around the lower pulley 480a within member 481 and below the lower fuselage skin and thence through the ball-bearing outlet device 481' as shown.

As mentioned in connection with Fig. 10, but here clearly specifically shown, member 481 carries the normally inboard four-way (right, left, fore and aft) lever assembly, the rearward arm of which serves as an anchor point for the control cables 507—511 similar to those heretofore described. And the forward arm is adapted to serve as an anchor for control cables 506—510. Rudder-bar 512 and cables 501—502, the latter optionally provided with lower spring reliefs as indicated, are self-explanatory and are comparable to the like elements of Fig. 10, for instance. This applies equally to the rudder-control cables 517—518. The main wheels in Fig. 18 are movable through the two-way levers 503—503', responsive to actuation by boom 441bb through cables 507—511 and cables 506—510.

It is apparent that member 481 is of exaggerated size and that a more compact arrangement may be readily achieved. It is also clear that the comparatively short boom 441bb may be much longer in proportion to the airplane as a whole. It may, as one of various options, be of a length to be received within a belly-slot which could be straddled by the base which supports shock-cylinder 477, as foretold regarding Fig. 10. In order to facilitate the quick release of hook 472, as explained previously, it is believed advisable to provide means for allowing the boom to swing somewhat to right or left, as at phantom 532, when ready for a snatch. For this purpose there is provided a torsion spring 533 in combination with the optional rotatable mounting 533'; this contrivance having the added features of automatically snapping the boom back to the correct position for vertical retraction within its belly-groove. Schematic motor 535 therefor is self-explanatory.

In brief, while the drawing shows the boom, at position 532, extending somewhat laterally downward to meet the loop cord, in practice it may be found entirely satisfactory to lower the boom only vertically, permitting the tension of the loop-line to swerve same to the right or the left as necessary to permit ready relinquishment of hook 472. Coincidentally, spring 533 would operate to snap the boom back to its vertical position for automatic retraction, for example, by motor 535.

Stability factors

At this juncture, it is important to note how positively, surely and automatically planes 1b and 1c are yieldably guyed and stabilized by the action of the aircraft pulling in one direction against the hawser line and the opposing tether or bridle action of said hawser through the landing boom or the halter, as the case may be.

This feature is clearly indicated in Fig. 18. For example, it is obvious that the main landing wheels together with the subsidiary wheel are traveling in a triangular formation, indicated generally by the four arrow pointers 534, and that the center of rotation of plane 1c may, therefore, be hypothetically indicated as being at or approximating the location of member 481. Clearly, it need not be at this particular point since the relative location of the several wheels to each other will cause said center of rotation to be either more forward or backward as, for example, wherein the nose wheel is well advanced relative to the main landing wheels or wherein the latter are more —or less—widely spaced apart in their extended positions. These are simple engineering determinations. Once established for a particular airplane, however, the center of rotation becomes a static point about which rotation may occur, during lineal travel, either to right or to left; and if, as in this view, the plane is crabbed around to the right and rather substantially toward the windward side, it is observed that the area of the aforesaid triangle which is to the left of a hypothetical line (such as line 536) drawn longitudinally of the line of pull and cutting through said triangle will be the smaller of the two thus unequally divided areas of the same.

Hence to the extent that rotation might be inclined to occur still farther to the right—beyond a desirable and safe attitude of the plane—because of an exceptionally high-velocity, right-angular wind component, to that same degree will corrective action thereagainst be exerted automatically by the hawser component. This will also, quite automatically, operate to balance out both wind-direction and wind-velocity subcomponents; and as the plane 1c approaches the location of final deceleration it will tend to swerve into a position in coalignment with the hawser, and the two sides of the triangle would tend to become equalized.

Naturally the lower the velocity of the cross-wind and the less right-angular its direction, the smaller the required angle of the crab at any time. A very sudden powerful ground gust (which could throw an airplane into a loop if equipped only with lockable wheel gear, and particularly if normal wheel-braking were being applied, before pilot-operated controls could be actuated) would merely serve to swerve the wings and fuselage of plane $1^c$, momentarily, somewhat more toward the windward side against the restraint of the hawser; and as the sudden gusty air current abated, self-reorientation would occur with far greater certainty and accuracy than is possible by human control.

Cross-wind take-offs

The cross-wind undercarriages heretofore described are intended to be used in connection with one-way airstrips, such as future rooftop strips or on carrier decks, to mention suitable examples, wherein runway space may be at a great premium, and where, in any case, it is desirable to provide assisted take-off devices for re-launching the planes. In short, by the use of said so-called electropults and the like for high-speed launchings, it is felt that these latter operations can be performed with the greatest ease and safety, and on brief runways of a length comparable to those required for hawser landings.

It may frequently happen, however, notwithstanding the provision for assisted take-offs in metropolitan areas and elsewhere, that airplanes, especially privately operated light planes, will be required to take off from small rural or suburban airstrips lacking such expensive installations. Ordinary cross-wind take-offs, of course, as compared to cross-wind landings, are relatively safer and are lacking such inherent hazards as nosing or looping due to the necessity for even normal wheel braking. The steadily accelerating airplane, at launching, is more easily controlled than the steadily or abruptly decelerated one during a landing operation. Moreover, at the time of take-off, the direction and velocity of the cross-wind can be accurately predetermined and much of the guesswork eliminated.

For general utility planes, therefore, it is provided that both the undercarriages and the boom, or boom-and-halter, tackle suitable for use on planes $1^b$ or $1^c$ may be employed for unassisted take-offs. One or two brief illustrations will suffice to explain those features which are required for coordination with the landing gear and flight controls which have not been earlier dealt with. Relative to plane $1^b$, the boom assembly of Fig. 6 has been chosen for this purpose; but in order to more clearly show the required modifications, the elements of said Fig. 6 should be considered in connection with the versions given in the detail of Fig. 20. Wherein the elements are the same in both views, or subject to but minor change to bring them into parallel, like numerals will be used.

The boom 441, Fig. 20, is suspended from the inner axle-like carriage 448$^b$, which carriage is rotatable within the outer rotatable carriage 448$^c$ similar to carriage 448. The normally non-rotatable collar 443 is the primary support. Boom 441, in this modification, has the gear wheel 455 for engagement by the worm of motor 453 as indicated; and to the extent that said wheel may extend upwardly in the position shown, element 448$^b$ may be recessed therefor or may be formed fully cylindrically to receive the motor 453 as well as support means for the shaft 449 as somewhat differently shown in Fig. 6. In fact, as was previously explained, the motor may be mounted upside down, and similar engineering details are purely optional.

As approximately seen in both Figs. 6 and 20—but not heretofore explained relative to take-offs—carriage 448$^c$ bears, in addition to the arm 447, the lever 447' integral therewith, and co-rotatable therewith; and as outer carriage 448$^c$ rotates, so rotates the elements 447—447' but not the boom 441, motor 453 and wheel 455, which are carried from inner carriage 448$^b$ except during landings as will shortly be explained.

The yoke device 537, which is turned slightly to one side in the drawing to clearly show both sides of the same, has occasional partial rotation and is adapted to be supported from the lower wall or edge of carriage 448$^c$ at any area between the periphery and inner carriage 448$^b$, and can be secured to said carriage 448$^c$ as required. While yoke 537 could be shaped in various ways, the arrangement here shown comprises the vertical side supports as indicated, one appendent from each side of member 448$^c$; said side supports curving inwardly and to the right in the drawing to an area of near abutment to form the yoke proper, having a throat area 537$^a$ just sufficiently wide for the free upward and downward movement of boom 441 therethrough until intercepted in the lower position as shown, where the adjacent sides of the yoke, curving backward (to the left) are preferably united at area 538.

Other features of the assembly include electrical conductors 539—539' leading to the control panel or other point of actuation; a two-way control lever 500 (see also Fig. 15), having the upstanding eye element or the like (not numbered) for connection with cable 501 of Figs. 15 and 19. Similar upstanding eyes or the like on the spider-supported arm 447 and lever 447', for connections with control cables 506—507, are self-explanatory.

It is evident that when boom 441 is fully retracted it will occupy a belly slot, as at position 540; that when fully extended for engagement with a hawser loop, it will be lowered to the yoke position shown; and that, upon engagement with loop 4 of the other drawing views, it will swing laterally within the yoke, causing partial co-rotation of both carriages 448$^b$ and 448$^c$ and actuating the landing wheel and rudder controls as aforesaid. But when the boom is fully retracted, the landing wheels and the rudder are subject to full control by the pilot, or autopilot as the case may be, since yoke 537—including the upper elements 447, 447' and 500 carried on carriage 448$^c$—may swing considerably laterally as required without involving a corresponding movement of the boom, which is now in its neutral position.

Interlocking switching means—not shown since well known in various related arts—will normally be provided to prevent the motor from operating to extend the boom for vertical movement except when ready to move into the yoke member. The motor, by means of the reversible worm, will normally free-wheel when the boom operates vertically under tension from hawser 5. The combination radial and thrust bearings 541 and 541' are of course self-explanatory. Any desired stop means may be provided to insure correct registry of throat 537$^a$ with boom 441 for its extension thereinto and to prevent any slight promiscuous motions of carriage 448$^c$ when the boom is at position 540. For example: the interlocking switch mechanism as aforesaid.

From the foregoing it is obvious that boom 441 co-operates with yoke 537 only in landing operations, and that when cross-wind launchings are to be made said boom is retracted and becomes entirely inoperative until required for the next cross-wind landing. If the assembly of Fig. 7 is to be employed, the necessary features may be readily supplied in view of explanations given relative to Figs. 6 and 20. In the case of plane $1^c$, however, the required modification, for such utility take-offs, is very slight indeed.

Thus, referring to Fig. 18, it is apparent that when the member 481 has been swung fully to the right, as in this view, only a slight tension will be thereby exerted on the lower halter line; and while a sufficient slack could readily be allowed therefor by providing twin pulleys, to prevent the slackened hawser from working out of the pulley groovings, it is preferable that the halter 473 shall be somewhat taut between piston rod 478 and the boom hook but not so taut that the slight swinging movement of member 481 will be too much resisted, within a predetermined limit, by the shock-cylinder 477. Accordingly, in Fig. 10, it is provided that spring 447$^a$ may be connected at its forward end to the thrust collar 542 adapted for slidable movement relative to rod 478; also, that between the thrust collar and the front wall of the cylinder there is positioned a weak spring 477$^b$. Consequently, upon application of relatively mild tension on the halter, such as by actuating the rudder-bar for a cross-wind take-off, spring 447$^b$ will yield readily as required for the lateral movement of member 481; and, on the other hand, when the boom engages loop 4, spring 447$^b$, in that relation, could also serve to very slightly graduate the suddenness of the tension to better equalize the full damping action of cylinder 477.

If combined spring and pneumatic shock absorption is to be used, suitably disposed bleeder means may be provided therefor. The outboard portion of element 481, incidentally, may be closer to the fuselage than shown in Fig. 10 and may have a longer rearward or nozzle section, as, for illustration, see Fig. 18.

In this connection, current descriptions have been confined to so-called unassisted cross-wind take-offs, for the reason that special types of drift gear are necessary for launchings by various catapulting devices. These, moreover, including certain subsidiary apparatus applicable to glider craft and to launchings by locomotive airplanes, are dealt with in my co-entered application entitled Cross-Wind Landing and Launching System, bearing Serial No. 23,645 and filed April 27, 1948; which application is to be regarded as a co-related extension of the means and procedures disclosed herein.

Ski-and-runner combinations

References heretofore to main and subsidiary landing wheels have been made to simplify the description; but it is to be understood that where the term "wheel" or "wheels" is used, including the claims hereafter, the same may also imply other forms of landing gear, as for examples, skis, skids, floats, etc. And although only a subsidiary nose wheel 440 has been shown, wherein tail wheels may hereafter be similarly employed as subsidiary gear, the term "subsidiary landing wheel" applies to such an optional arrangement.

With especial regard to skis and the like, and for use in arctic and near-arctic climates, a particularly useful alternative type of landing element is provided in the form of the optionally swivelled, and optionally casterable, ski-runner 543 of Fig. 5ª.

In brief, ski-runner 543 is a combination of landing ski and ice skate, having both the main ski portion 544 and a longitudinal, centrally disposed blade or keel member 545 therebelow, similar to the runners on ice boats. When, therefore, a landing is to be made on snow-covered surfaces, as at dotted line 546, the ski-portion will function normally and the runner 545 will in no material way impair the skiing action; but when cross-wind operations are to be conducted on ice, as at line 547, it is obvious that runner 545 will then function independently of the ski portion and, also, that by cutting a groove for itself in the surface of the ice, it will exert a stabilizing effect on the aircraft in cross-wind operations especially, against slippage and skidding.

The fork portion 548 as well as the broken off shock portion 549 are self-explanatory.

A new departure

From the foregoing it is obvious that the apparatus disclosed herein is, in no sense, a mere improvement upon the inherently limited and particularly hazardous system of the recent prior art. In the first place, in the matter of landings, it is obviously characteristic of the present invention that the airplane to be landed is at no time "vulnerable," in the sense of an unassisted pilot-controlled landing, during which latter the craft is of course subject to sundry hazards from the instant of grounding contact.

The present system requires no so-called drift indicator nor any complementary undercarriage indicators. The normally crabbed airplane can merely come in on a reasonably correct glide path for the cross-wind landing, including engagement with the station apparatus, and, however its exact attitude relative to the runway and to the direction or velocity of the cross-wind (its own air speed being considered), these factors begin to balance out automatically before the airplane has even contacted the runway surface, since superinduced by the hawser and decelerating components exercising remote control over the entire craft from rudder to subsidiary landing wheel, including the main undercarriage. The craft, therefore, alights correctly and is correctly master-controlled through the boom or halter means, responsive to the hawser component, at every subsequent stage of the roll-off.

The disclosed system requires no master—or even supplementary—locking means for the landing wheels, hence no heavy and expensive instrumentation therefor on either light planes or the larger aircraft. The system requires no supplementary braking of any nature other than that afforded by the landing hawser and associated station tackle.

The original direction of travel of the landing gear after grounding is substantially maintained, and at no time are the wheels out of control or subject to even momentary misalignment, the optional override becoming largely an auxiliary to be used only upon rare occasions if at all in a landing operation. According to the recently most publicised existing systems, the setting and locking of the wheels must be accomplished through a series of distinct pilot-controlled operations involving locking, unlocking, re-setting and relocking details. Wherein these operations may be attempted automatically, according to the prior means and method, a very slight error, or some unforeseen factor such as a sudden heavy gust of air against the unstabilized aircraft, could result in failure before automatic control, as by means of the hydraulic timelag mechanism of the prior art, could take effect. The pilot, in short, could not always correct for misalignment instantaneously as would, in a sudden emergency, be quite necessary.

As indicated previously, planes 1ᵇ or 1ᶜ may be landed without employment of any override control on the subsidiary landing wheel; nor is it essential that any of the wheels shall be caster-mounted, since all are positively mechanically controlled and, hence, independent of castering for directional stabilization relative to the taxiing path of the airplane. Buckling and shimmying is therefore automatically eliminated. According to the prior system, automatic landings—particularly 100 per cent "robot" controlled landings which are contemplated in the not distant future—would be entirely impracticable if not impossible, in view of the necessity for the exercise of pilot judgment and pilot operation of the controls of virtually all stages.

The hawsers referred to herein may be formed, either wholly or in part, from materials having pronounced elastic characteristics—more particularly materials, such as plastic substances, which combine the qualities of great tensile strength, exceptional elongation, a high degree of shock dissipation throughout their length and relatively slow elastic memory: these and other specific qualities being incorporated in such plastic cordage as is presently known to the aeronautical arts as "nylon" when specially preworked. See, for example, Patent No. 2,407,634 to Richard C. du Pont, entitled "Shock-Absorbing Aerial Towline."

It is understood that my disclosure is by no means limited merely to the embodiments shown herein, or in any other manner except according to a proper interpretation and/or adjudication of the hereafter appended claims.

I, therefore, claim:

1. In a landing system, the combination including: a landing surface; an airplane to be engaged while in airborne relation to said surface and thence landed and decelerated thereon; flight-control means, including automatic pilot instrumentalities, on said plane; a line-engaging element extensible from said plane and operably entrained with said flight-control means; and station means for causing said flight controls to be actuated to automatically lower said line-engaging element and said airplane into respective line contact and grounding contact with said surface, said station means comprising a length of landing hawser, line pay-out means to which one end portion of said hawser is connected, and means to support the other terminal portion of said hawser in a position for its ready contact by said line-engaging means of the aircraft.

2. Aircraft landing means including, in combination: a primary braking component and differential tackle operably intermediary of said braking component and an aircraft to be engaged decelerated; said braking component including at least one pneumatic pressure cylinder having a piston member externally entrained with said differential tackle, and the tackle component per se incorporating a length of flexible hawser formed at one disposable end portion thereof with means for its engagement by an element extensible from said aircraft.

3. In an aircraft, the combination with a swiveled undercarriage therefore which includes a landing boom operably entrained with said undercarriage; said boom being also mounted for swiveling movement, relative to the longitudinal axis of said craft, and for its extension normally longitudinally of a runway to be traveled at an angle to the prevailing wind component and the aircraft main body structure, but co-longitudinally with respect to the heading of said undercarriage after its touch-down on said runway; said boom being provided with a landing hook of the type which engages flexible hawser tackle at an aircraft landing station.

4. In an aircraft, the combination with the main aircraft body structure which includes: a first boom-suspension carried on said main body structure; a boom member carried from said suspension, and a landing hook on said boom in a position for its engagement with flexible hawser tackle at a landing station; a subsidiary boom suspension connected to said first named suspension against relative movement therebetween; means enabling the latter—said first suspension—to permit lateral swingable movement of said boom member, responsive to the normal tug of said hawser tackle, throughout the outboard length thereof; and means, coactive with said subsidiary suspension, for imparting respective vertically extensible and retractive movements to said boom.

5. The combination of claim 4 which includes means to cushion the initial operation of said boom, when making a landing contact, in opposal to stresses tending to deliver a sudden shock to the aircraft main body structure.

6. Aircraft components and auxiliaries comprising, in combination: surface station facilities including a flexible landing hawser; an airplane having hawser-engaging means dependent therefrom; main landing wheels on said airplane laterally spaced apart, and at least one subsidiary landing wheel spaced longitudinally of the airplane body from the main landing wheels, said main and said subsidiary wheels being each mounted for swiveling movement about respective axes; means for directionally controlling the forward roll of said wheels along substantially parallel tread paths relative to the longitudinal axis of said plane after contact with a landing surface, said directional control means comprising a master wheel-coordinating device on said plane and mechanism connecting said device with subsidiary means entrained with each of said landing wheels whereby they are enabled to be variably directionally controlled in indirect coaction with said hawser-engaging means; said station facilities further including apparatus in train with said landing hawser, and coactable with each of said hawser-engaging means and said wheel-coordinating device for exerting varying orders of tension thereagainst, and against the airplane as a unitary whole, responsive to the variable landing and decelerating speeds of said plane.

7. In combination: components including main swiveled landing wheels laterally spaced apart on an aircraft, at least one swiveled subsidiary landing wheel spaced longitudinally of the aircraft from the main landing wheels, a landing boom, and means interconnecting said boom with a group of control devices entrained with each of said wheels for causing them to travel variable tread paths on a runway substantially parallel to each other and to the longitudinal axis of said boom, as variably positioned, but frequently normally oblique to the longitudinal axis of said airplane in the presence of a cross-wind.

8. In combination: aircraft components including a plurality of undercarriage wheels; an airframe main body carried thereon; a landing boom mounted for at least lateral swingable movements relative to the longitudinal axis of the main airframe structure; a landing hook on said boom; means remotely interconnecting said boom—including said hook—with each of said undercarriage wheels, whereby they may be severally automatically actuated simultaneously for co-parallel travel as to each other and to the longitudinal axis of said boom-and-hook member, as variably positioned attitudinally; and other means remotely interconnecting at least one of said undercarriage wheels with one, at least, aircraft flight control device for automatic actuation thereof, along with said undercarriage wheels, by the boom-and-hook component.

9. In combination: a main airframe structure and a unitary landing boom and hook member extensible therefrom, swively-mounted landing gear on said airframe structure, and means, said boom and hook component and said landing gear for coordinated movements therebetween, including the automatic control of the directional attitude of said landing gear contrary to the frequently crabbed attitude of the airframe proper, upon grounding, in the presence of a cross-wind.

10. In an airplane of the class having swiveled landing gear in combination with extensible means for engaging said plane with surface tackle for rapidly decelerating it, that improvement wherein said extensible means includes a length of halter line as well as means on one end thereof for enabling it to become engaged to said surface tackle, and wherein landing-gear-direction-controlling means are carried on said plane in an entrained relation with said halter line.

11. In landing and decelerating means, the combination comprising: a landing surface; aircraft landing facilities, including a movable vehicular device, associated with said surface; a winch mounted on said vehicular device; a length of flexible hawser line having a portion thereof entrained with said winch; and means by which another portion of the hawser, remote from said entrained portion is releasably supportable in a position to be snatched by a hawser-engaging means extensible from an aircraft to be landed and decelerated on said surface.

12. Aircraft landing apparatus comprising in combination: a length of flexible landing hawser having a closed loop at one end portion thereof; means by which a sectional strand of said loop is suspended releasably in the path of travel of an airplane landing hook, and differential elements to which said hawser is elsewhere entrained; said differential elements including: a primary braking component, having a member thereof which is movable yieldably but resistingly against applied tension; a differential type winch having a drum and a drum line; a sheave-wheel carried on said movable member of the primary braking component, over which wheel a paid out portion of said drum line is trained; and a vehicular device which is movable relative to said primary braking component, on which vehicular device the said winch is mounted; the latter—said winch—being provided with a pulley wheel of a known greater diameter than the diameter of said drum, and over which pulley wheel said hawser is trained for differential action in cooperation with each of said drum line, said drum, said vehicular device, said sheave-wheel, and said primary braking component.

13. In aircraft landing apparatus, the combination including: at least one pneumatic cylinder having one, at least, bleeder vent formed therein and a unitary plunger-and-piston element movable longitudinally within said cylinder, an externally protruded portion of said movable element bearing a sheave-wheel; a length of trackway; a vehicular dolly adapted for movement along said trackway; a winch on said dolly; a drum on said winch; a pulley wheel normally combined with said drum, which wheel is of a diameter greater than the known diameter of the drum housing; a flexible line windable on said drum and adapted to be paid off therefrom to and around said sheave-wheel of said movable element, the opposite end of said line being affixed to a suitable anchorage which is normally stationarily carried from said dolly; another line—called landing hawser—being affixed at one end thereof to an anchorage remote from said at least one cylinder and desirably forward of the dolly's path of travel along said trackway, away from the location of the cylinder, said hawser being also trained about said pulley wheel of the drum component and formed, at the other end portion thereof, with means enabling it to be readily engaged by snatch-tackle complementary thereto on an aircraft to be landed and decelerated; and auxiliary means by which said other end portion of said hawser is releasably supported in the travel path of the snatch-tackle.

14. In a landing system for aircraft; the combination including a length of trackway, a vehicular device movable along said trackway, pneumatic type braking means operable to decelerate said device relative to said trackway, and a length of flexible landing hawser extensible from the vehicular device in a position for its engagement by means complementary thereto on an aircraft to be contacted and decelerated; said pneumatic type braking means comprising at least one air chambered device occupying a stationarily mounted position with respect to said trackway, and auxiliary instrumentalities interconnecting said chambered device to said landing hawser.

15. In an airplane, the combination therewith comprising an undercarriage having main landing gear components and at least one steerable subsidiary landing gear component; an airplane rudder; rudder-actuating means; a landing hook; means to extend said hook from said airplane to a position enabling it to engage landing and arresting instrumentalities complementary thereto at a surface station; and means co-actably entraining each of said landing hook, said rudder-actuating means, and said subsidiary landing gear component.

16. In an airplane, the combination therewith comprising an undercarriage including main landing gear components and at least one steerable subsidiary landing gear component; means carried for extensible movement from said airplane and for interconnecting the latter with braking facilities complementary thereto at a surface station; and direction-of-travel control means interconnecting said extensible means with at least the said subsidiary landing gear component.

References Cited in the file of this patent

UNITED STATES PATENTS

| Number | Name | Date |
|---|---|---|
| 1,340,325 | Caulkins | May 18, 1920 |
| 1,499,472 | Pratt | July 1, 1924 |
| 1,647,619 | Hall | Nov. 1, 1927 |
| 1,670,402 | Campbell | May 22, 1928 |
| 1,779,168 | Isom | Oct. 21, 1930 |
| 1,789,653 | Hoyt | Jan. 20, 1931 |
| 1,806,992 | Fieux | May 26, 1931 |
| 1,807,429 | Olaszy | May 26, 1931 |
| 1,843,640 | Jackson | Feb. 2, 1932 |
| 1,908,408 | Cox | May 9, 1933 |
| 1,914,573 | Kookogey | June 20, 1933 |
| 1,997,945 | Olaszy | Apr. 16, 1935 |
| 2,064,599 | Foges | Dec. 15, 1936 |
| 2,197,299 | Fleet | Apr. 16, 1940 |
| 2,240,947 | Wilson | May 6, 1941 |
| 2,376,374 | Miles | May 22, 1945 |
| 2,380,105 | Gerrard | July 10, 1945 |
| 2,394,496 | Stephan | Feb. 5, 1946 |
| 2,402,918 | Schultz | June 25, 1946 |
| 2,404,381 | Jolly | July 23, 1946 |
| 2,419,438 | Clark | Apr. 22, 1947 |
| 2,421,512 | Leitch | June 3, 1947 |
| 2,433,893 | Cowgill | Jan. 6, 1948 |
| 2,448,209 | Boyer | Aug. 31, 1948 |
| 2,470,696 | Gonzales | May 17, 1949 |
| 2,477,881 | King | Aug. 2, 1949 |
| 2,483,655 | Schultz | Oct. 4, 1949 |
| 2,484,230 | Jones | Oct. 11, 1949 |

FOREIGN PATENTS

| Number | Country | Date |
|---|---|---|
| 51,939 | Austria | Jan. 25, 1912 |
| 88,985 | Switzerland | Nov. 4, 1920 |
| 91,454 | Switzerland | Mar. 9, 1921 |
| 287,189 | Great Britain | Mar. 12, 1928 |